US011511442B2

(12) United States Patent
Song et al.

(10) Patent No.: US 11,511,442 B2
(45) Date of Patent: Nov. 29, 2022

(54) GRIPPING APPARATUS AND METHOD OF PRODUCING A GRIPPING APPARATUS

(71) Applicants: MAX-PLANCK-GESELLSCHAFT ZUR FÖRDERUNG DER WISSENSCHAFTEN E.V., Munich (DE); Carnegie Mellon University, Pittsburgh, PA (US)

(72) Inventors: Sukho Song, Stuttgart (DE); Metin Sitti, Stuttgart (DE); Dirk-Michael Drotlef, Sindelfingen (DE); Carmel Majidi, Pittsburgh, PA (US)

(73) Assignees: MAX-PLANCK-GESELLSCHAFT ZUR FORDERUNG DER WISSENSCHAFTEN E.V., Munich (DE); CARNEGIE MELLON UNIVERSITY, Pittsburgh, PA (US)

( * ) Notice: Subject to any disclaimer, the term of this patent is extended or adjusted under 35 U.S.C. 154(b) by 148 days.

(21) Appl. No.: 16/610,209

(22) PCT Filed: May 2, 2018

(86) PCT No.: PCT/EP2018/061229
§ 371 (c)(1),
(2) Date: Nov. 1, 2019

(87) PCT Pub. No.: WO2018/202729
PCT Pub. Date: Nov. 8, 2018

(65) Prior Publication Data
US 2020/0061845 A1    Feb. 27, 2020

Related U.S. Application Data

(60) Provisional application No. 62/500,778, filed on May 3, 2017.

(51) Int. Cl.
*B25J 15/00*    (2006.01)

(52) U.S. Cl.
CPC ......... *B25J 15/0023* (2013.01); *B25J 15/008* (2013.01)

(58) Field of Classification Search
CPC ....... B25J 15/0023; B25J 15/008; B25J 15/12
See application file for complete search history.

(56) References Cited

U.S. PATENT DOCUMENTS 7,762,362 B2 *  7/2010  Cutkosky ............. B62D 57/024
                                                 180/8.5
2006/0202355 A1 *  9/2006  Majidi ...................... C09J 7/10
                                                 257/783

(Continued)

FOREIGN PATENT DOCUMENTS

DE    102014205988 A1    10/2015
JP        01004585 A    1/1989

(Continued)

OTHER PUBLICATIONS

International Search Report for related PCT Application No. PCT/EP2018/061229; dated Aug. 29, 2018; 15 pages.
English Translation of Korean Office Action, 1 page.

*Primary Examiner* — Stephen A Vu
(74) *Attorney, Agent, or Firm* — Dickinson Wright PLLC

(57) ABSTRACT

The present invention relates to a gripping apparatus comprising a membrane; a flexible housing; with said membrane being fixedly connected to a periphery of the housing. The invention further relates to a method of producing a gripping apparatus.

19 Claims, 24 Drawing Sheets

(56) References Cited

U.S. PATENT DOCUMENTS

| | | | |
|---|---|---|---|
| 2014/0272272 A1* | 9/2014 | Spenko | B29C 39/026 |
| | | | 428/113 |
| 2016/0052145 A1 | 2/2016 | Spicer et al. | |
| 2016/0075036 A1 | 3/2016 | Lessing et al. | |
| 2016/0200945 A1* | 7/2016 | Hawkes | C09J 7/00 |
| | | | 428/172 |
| 2016/0200946 A1 | 7/2016 | Hawkes et al. | |
| 2016/0361821 A1* | 12/2016 | Lessing | B25J 15/0061 |
| 2017/0036355 A1* | 2/2017 | Lessing | B25J 9/142 |
| 2017/0066138 A1* | 3/2017 | Hawkes | B25J 15/008 |
| 2017/0203443 A1* | 7/2017 | Lessing | B25J 15/0014 |
| 2017/0291806 A1* | 10/2017 | Lessing | B25J 9/1612 |
| 2019/0202070 A1* | 7/2019 | Nakagawa | B25J 15/0023 |

FOREIGN PATENT DOCUMENTS

| | | | |
|---|---|---|---|
| JP | 2003062782 A | 3/2003 | |
| JP | 2012110982 A | 6/2012 | |
| JP | 2015202543 A | 11/2015 | |

\* cited by examiner 1. 3D Printing

4. Inking

2. Surface Modification

5. Bonding, Curing RT

3. Thin Film Fabrication

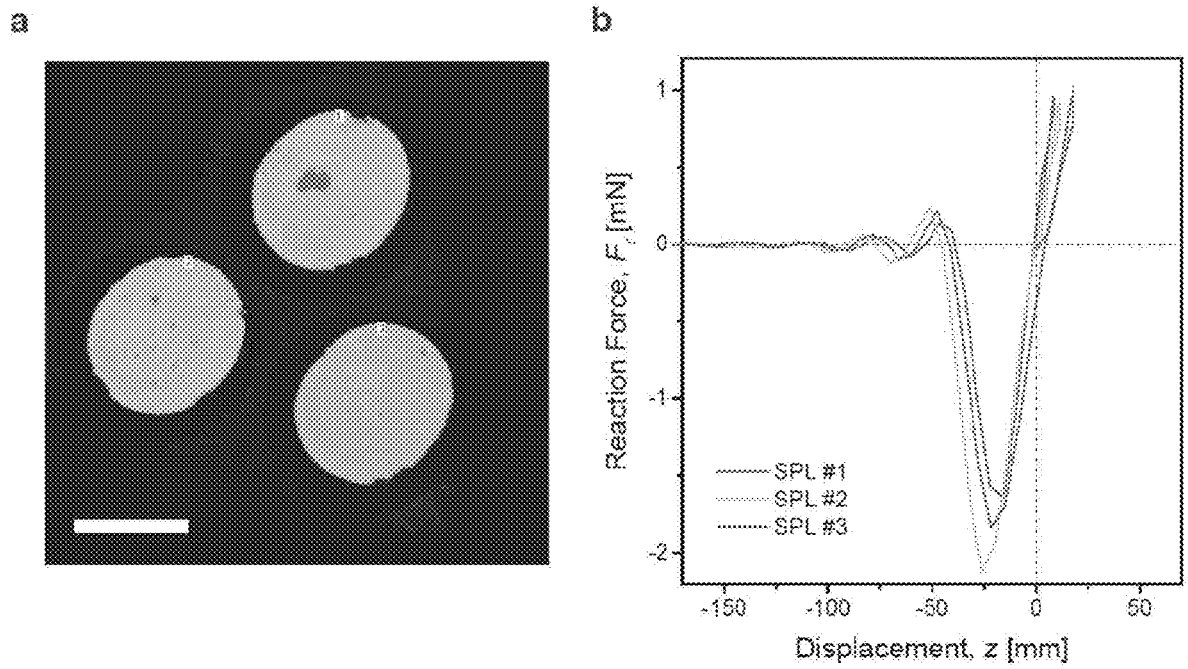

Fig. 16

Table S1 | Characterization results of the rigid adhesion system

| Characterization Parameters | $d_b$ 15 mm | $d_b$ 30 mm | $d_b$ 60 mm | Flat Glass |
|---|---|---|---|---|
| Contact Area, $A_c$ [cm$^2$] | N/A | N/A | 1.7 | 1.7 |
| Highest initial Pressure, $\Delta P_{0|h}$ [kPa] | 2.0 | 2.7 | 1.6 | 1.6 |
| Lowest initial Pressure, $\Delta P_{0|l}$ [kPa] | -0.7 | -4.1 | -3.2 | -2.9 |
| Min. Pull-off Force, $F_{off|Min}$ [N] | 0.13 | 0.12 | 0.30 | 0.52 |
| Max. Pull-off Force, $F_{off|Max}$ [N] | 0.15 | 0.62 | 0.88 | 1.12 |
| Enhancing Ratio, $F_{off|Max} / F_{off|Min}$ | 1.2 | 5.0 | 3.0 | 2.2 |
| Min. Adhesion Stress, $\sigma_{ad|Min}$ [kPa] | N/A | N/A | 1.2 | 2.0 |
| Max. Adhesion Stress, $\sigma_{ad|Max}$ [kPa] | N/A | N/A | 3.5 | 4.4 |
| Min. Adhesion Efficiency, $\varepsilon_{ad|Min}$ [%] | N/A | N/A | 1.8 | 3.1 |
| Max. Adhesion Efficiency, $\varepsilon_{ad|Max}$ [%] | N/A | N/A | 5.2 | 6.6 |

Fig. 17

Table S2 | Characterization results of the soft adhesion system

| Characterization Parameters | $d_b$ 15 mm | $d_b$ 30 mm | $d_b$ 60 mm | Flat Glass | Rubber Film |
|---|---|---|---|---|---|
| Contact Area, $A_c$ [cm$^2$] | 0.6 | 1.5 | 2.5 | 2.5 | 2.5 |
| Highest initial Pressure, $\Delta P_{ib}$ [kPa] | 1.5 | 0.6 | 3.6 | 1.7 | 0.3 |
| Lowest initial Pressure, $\Delta P_{il}$ [kPa] | -51.0 | -50.7 | -52.1 | -51.7 | -50.9 |
| Min. Pull-off Force, $F_{off|Min}$ [N] | 0.18 | 0.42 | 0.49 | 0.66 | 0.08 |
| Max. Pull-off Force, $F_{off|Max}$ [N] | 1.18 | 2.70 | 2.91 | 3.61 | 0.61 |
| Enhancing Ratio. $F_{off|Max} / F_{off|Min}$ | 6.7 | 6.4 | 6.0 | 5.4 | 7.2 |
| Min. Adhesion Stress, $\sigma_{ad|Min}$ [kPa] | 2.8 | 2.8 | 1.9 | 2.6 | 0.3 |
| Max. Adhesion Stress, $\sigma_{ad|Max}$ [kPa] | 18.7 | 18.1 | 11.4 | 14.2 | 2.4 |
| Min. Adhesion Efficiency, $\varepsilon_{ad|Min}$ [%] | 3.9 | 3.9 | 2.6 | 3.6 | N/A |
| Max. Adhesion Efficiency, $\varepsilon_{ad|Max}$ [%] | 23.7 | 25.0 | 15.8 | 19.5 | N/A |

Fig. 18

Table S3 | Summary of $F_{off}$, $\omega_{ad}$ and $\sigma_{ad}$ of the FAM for the rigid adhesion system

| Position | Pull-off force, $F_{off}$ [mN] | Projected Contact Area, $A_{pc}$ [mm$^2$] |
|---|---|---|
| Top | 66.3 | |
| Center | 82.1 | |
| Bottom | 80.6 | 0.78 |
| Left | 82.4 | 0.78 |
| Right | 78.8 | 0.76 |
| AVG. | 78.0 | 0.77 |
| Work of Adhesion, $\omega_{ad}$ [J·m$^{-2}$] | | 4.1 |
| Adhesion Stress, $\sigma_{ad}$ [kPa] | | 100.8 |

Fig. 19

Table S4 | Summary of $F_{off}$, $\omega_{ad}$ and $\sigma_{ad}$ of the FAM for the soft adhesion system

| Position | Pull-off force, $F_{off}$ [mN] | Projected Contact Area, $A_{pc}$ [mm²] |
|---|---|---|
| Top | 105.8 | |
| Center | 41.6 | 0.84 |
| Bottom | 55.1 | |
| Left | 68.0 | 0.87 |
| Right | 38.3 | 0.86 |
| AVG. | 61.8 | 0.86 |
| Work of Adhesion, $\omega_{ad}$ [J·m⁻²] | | 3.3 |
| Adhesion Stress, $\sigma_{ad}$ [kPa] | | 72.5 |

Fig. 20

Table S5 | $F_{off}$, $A_c$ and $\sigma_{ad}$ of a single fiber and small area of microfiber array

| Sample | Adhesion, $F_{off}$ [mN] | Real Contact Area, $A_{rc}$ [µm²] | Projected Contact Area, $A_{pc}$ [µm²] |
|---|---|---|---|
| SPL #1 | 1.8 | 12787.0 | 20687.3 |
| SPL #2 | 2.1 | 13451.3 | 20586.1 |
| SPL #3 | 1.7 | 12552.0 | 21025.9 |
| AVG. | 1.9 | 12930.1 | 20766.4 |
| Single Fiber Adhesion, $F_{off|sf}$ [mN] | | | 0.6 |
| Single Fiber Real Contact Area, $A_{rc|sf}$ [µm²] | | | 4310.0 |
| Single Fiber Adhesion Stress, $\sigma_{ad|sf}$ [kPa] | | | 145.4 |
| Three Fibers Adhesion Stress, $\sigma_{ad|sf}$ [kPa] | | | 90.5 |

Fig. 21

GRIPPING APPARATUS AND METHOD OF PRODUCING A GRIPPING APPARATUS

The present invention relates to a gripping apparatus comprising a membrane; a flexible housing; with said membrane being fixedly connected to a periphery of the housing. The invention further relates to a method of producing a gripping apparatus.

Adhesion-controlled grasping of complex three-dimensional (3D) surfaces, such as is needed in transfer printing, robotic manipulation and locomotion, and precision manufacturing, is very challenging, because the adhesive must be soft enough to enable intimate contact under light pressure but stiff enough to support high loads.

By exploiting principles of equal load sharing and interfacial crack pinning, gecko-inspired dry micro/nanofiber adhesives can firmly adhere to planar surfaces using intermolecular interactions, such as van der Waals forces. Using the same attachment method, gecko-inspired synthetic elastomeric fibrillar adhesives achieve bond strengths of over 100 kPa on smooth flat surfaces, surpassing the performance of the gecko on such surfaces, and exhibit quick release through peeling or buckling of the microfibers. For the past decade, gecko-inspired adhesives have been applied to a variety of systems including numerous robotic applications for wall climbing, perching devices for flyers, and grippers.

However, difficulties arise in dealing with three-dimensional (3D) surfaces, because the current gecko-inspired synthetic adhesive systems are often supported by a rigid backing, which limits their ability to conform to non-planar surfaces. In previous work, an elastomer fibrillar adhesive integrated with a soft membrane was developed, which was called a fibrillar adhesive on a membrane (FAM), and fixed the membrane onto a 3D-printed rigid plastic body so that the system could handle various 3D objects.

Despite demonstrating a significant improvement over an unstructured flat elastomer membrane with 10 times higher adhesion, the tested FAM could achieve only 2 kPa of adhesion stress, a small fraction of the 55 kPa measured with rigid-backed microfiber arrays. This implies that the improved conformability to 3D surfaces enabled by the more compliant membrane backing is at the expense of a 96% reduction in adhesion strength. Considering that the adhesion of a membrane scales with the circumferential length of the contact interface and not with the area, the results above suggest that the size of the membrane, whether including structures or not, has to be vastly increased in order to support a high load-carrying capacity.

Enhancing the adhesion strength of an adhering membrane requires more uniform load sharing throughout the contact interface. Frictional attachment systems have been proposed that could improve the lateral load sharing capability and friction of micro-wedge structures by scaling up to larger areas on flat and slightly curved surfaces.

However, no adhesive attachment system has hitherto succeeded in improving the perpendicular load sharing and adhesion of fibrillar structures for complex 3D surfaces. A backing layer made out of stiffness-tunable materials such as liquid metals, thermoplastics, or shape memory polymers can adapt to 3D surfaces when they are soft and support high fracture strength when they are hardened.

However, challenges still remain in managing deformable substrates (e.g., plastic foils, rubber-like stretchable surfaces, thin metal films), because the stiffened backing cannot accommodate deformation, resulting in stress concentrations at the contact edges. Therefore, all adhesive gripping tasks are limited by a fundamental trade-off between compliance/conformability and rigidity/strength. While adhesives must be compliant enough to conform to complex 3D or deformable geometries, the same system must remain rigid enough to maximize interfacial (Mode I) fracture strength in order to support the object's weight.

In view of this background it is an object of the present invention to provide a gripping apparatus that achieves the required deformation while at the same time ensuring the required adhesion strength.

This object is satisfied by a gripping apparatus in accordance with claim 1.

Such a gripping apparatus comprises a membrane; a flexible housing; with said membrane being fixedly connected to a periphery of the flexible housing; a cavity present between the membrane and the housing; and a connection to an air pressure regulator, such as a syringe pump or a vacuum pump, connected to said cavity.

In this way the invention utilizes a flexible housing in addition to the inherently flexible membrane the combination of which enables an independent control of 3D conformability and bond strength of the gripping apparatus. This novel architecture exhibits enhanced and robust adhesion on various sizes of 3D and deformable surfaces.

In summary, a soft load sharing system is presented that controls normal load distribution on 3D surfaces by exploiting the influence of internal pressure on interfacial load sharing. This soft system architecture addresses the fundamental challenge of having high surface conformability while simultaneously maintaining high fracture strength. By utilizing a soft and deformable body (housing) and controlling the negative pressure differential acting on the interface when the cavity of the gripping apparatus is evacuated, the proposed system pushes the upper limit on the maximum adhesion-controlled gripping strength that can be achieved on non-planar 3D geometries.

Preferably an outer surface of the membrane comprises a plurality of islands projecting from an outer surface of the membrane remote from the cavity. The use of a plurality of islands may enhance the adhesion on the contact interface. These features result in the proposed soft gripping apparatus outperforming conventional adhesive systems for a broad range of surface shapes and length scales.

It is preferred if the plurality of islands is formed by pillars or by nano-bumps. Such asperities can be simply formed in a mold and provide the skilled person with a variety of options for improving the adhesion of the membrane to an object.

Advantageously a spacer structure is present in said cavity. A spacer structure present in the cavity enables a uniform pressure to be generated in the cavity when applying vacuum, as the spacer structure is configured to maintain spacing between housing and the membrane when the cavity is evacuated. In this way an equal load sharing method is made available. The equal load sharing method represents a new paradigm for adhesion-based soft systems that outperform previous microfibrillar adhesives in handling complex 3D and deformable objects and surfaces.

It is preferred if the spacer structure is attached to an inner surface of the housing facing said membrane (or vice versa). In this way the spacer structure can be integrally formed on an inner surface of the housing. The shape, size, and interval of those spacer structures may vary depending on the gripping purpose.

Preferably the spacer structure comprises interconnecting channels. These interconnecting channels enable a uniform evacuation of the space of the cavity in particular such that the channels each have the same partial pressure when the cavity is evacuated.

It is preferred if the spacer structure comprises a plurality of posts. Posts, in particular cylindrically shaped posts are simple and cost effective to manufacture particularly when the posts are integrally formed at the inner surface of the membrane.

Depending on the design of the gripping apparatus the membrane and the housing are either made of different material or preferably of the same material, in particular these are integrally formed, e.g. in a common mold or are bonded to one another using a bond layer in the periphery of the housing.

In a preferred embodiment the flexible housing is made of a material having a Young's modulus selected in the range of 10 kPa to 600 MPa. Materials having a Young's modulus in this range exhibit the flexibility required for the housing and the membrane to be deformed such that they can, on the one hand, grip the object of interest and, on the other hand at least substantially conform to one another ensuring a uniform pressure distribution within the cavity.

In this connection it should be noted that a material of at least one of the housing, the membrane and a bond layer provided between the housing and the membrane in the periphery of the housing is selected from the group of members consisting of polymers, rubbers, composites, thermoplastic materials, hydrogels, phase changing materials, shape memory materials, liquid materials, VS, PDMS, liquid crystal elastomers, elastomeric rubbers, silicone rubbers, polyurethane and combinations of the foregoing.

Advantageously the cavity is configured to be evacuated in order to carry out a gripping function, with the housing and the membrane being configured to conform to a shape at least substantially reflecting the shape of a surface of the object to be gripped. By deflating the gripping apparatus this is deformed such that it conforms to and/or adapts to the shape of the surface of the object it should grip.

In this connection it should be noted that the plurality of posts of the spacer structure beneficially separate the interconnecting channels and define a spacing between the housing and the membrane when the cavity is evacuated. Through use of posts an at least substantially homogenous vacuum can hence be produced in and throughout the cavity.

In this connection it should be noticed that a simple syringe can be connected to the housing via the connection to an air pressure regulator (i.e., syringe pump). This syringe can then be used to evacuate air in the housing to cause a gripping apparatus having a membrane deflate such that it can grip various objects.

Preferably the cavity is configured to be evacuated to a pressure differential of −101.3 kPa with respect to the atmospheric pressure, in particular to a pressure differential in a range of +10 to −100 kPa with respect to atmospheric pressure. In this way the gripping apparatus can be completely deflated for a maximum adhesion strength with regard to the surface of the object.

Advantageously an at least substantially homogenous negative pressure differential is present within the spacer structure between the housing and the membrane. In this way a uniform adhesion strength is achieved over the entire outer surface of the membrane.

It is further preferred if the cavity is configured to release the pressure differential or to be inflated in order to carry out a release of a gripping function of the gripping apparatus. By being able to re-introduce more or at least the same amount of gas, e.g. air, removed from the cavity of the gripping apparatus as was removed a gripping apparatus having a reversible gripping function is obtained.

For adhering to three-dimensional (3D) surfaces or objects, current adhesion systems are limited by a fundamental trade-off between 3D surface conformability and high adhesion strength. This limitation arises from the need for a soft, mechanically compliant interface, which enables conformability to non-flat and irregularly shaped surfaces but significantly reduces the interfacial fracture strength. In this work, we overcome this trade-off with an adhesion-based soft gripping system that exhibits enhanced fracture strength without sacrificing conformability to non-planar 3D surfaces.

The gripping apparatus is composed of a gecko-inspired elastomeric microfibrillar adhesive membrane that is supported by a pressure-controlled deformable gripper body. The proposed soft gripping apparatus controls the bonding strength by changing its internal pressure and exploiting the mechanics of interfacial equal load sharing. The soft adhesion system can utilize up to 26% of the maximum adhesion of the fibrillar membrane, which is 14 times higher than the adhering membrane without load sharing. The proposed load sharing method suggests a new paradigm for soft adhesion-based gripping and transfer printing systems that achieves area scaling similar to that of a natural gecko footpad.

In a further aspect the present invention relates to a method of producing a gripping apparatus. The gripping apparatus comprising: a membrane; a flexible housing; with said membrane being fixedly connected to a periphery of the housing; a cavity present between the membrane and the housing; and a connection to an air pressure regulator (i.e., syringe pump) connected to said cavity. The method comprises the steps of:

providing the housing and the membrane; with the membrane either being integral with the housing or bonded thereto at the periphery of the housing and optionally providing islands on the membrane at a side of the membrane remote from the cavity and/or providing a spacer structure in said cavity.

Further embodiments of the invention are described in the following description of the Figures. The invention will be explained in the following in detail by means of embodiments and with reference to the drawing in which is shown:

FIGS. 1a to f demonstrations of the proposed soft adhesion-based gripping system holding various 3D objects;

FIGS. 2a to c schematics of structure, mechanism and a representative adhesion test of the soft adhesion system in accordance with FIG. 1;

FIGS. 3a to c finite element analysis for modeling vertical stress within the fibrillar adhesives on a membrane (FAM);

FIGS. 4a to f analysis and force measurements in the rigid adhesion system for different 3D geometries;

FIGS. 5a to f characterization results of the soft adhesion system;

FIG. 6 scaling of the soft adhesion system compared to a flat microfiber array and biological gecko adhesives;

FIG. 7 a schematic showing the individual steps of the fabrication process for fabricating the FAM;

FIGS. 8a & b 3D scanned images of PDMS patterns and dimensions;

FIGS. 9a to c SEM images of mushroom-shaped elastomer microfiber arrays on the FAM;

FIG. 10 a schematic showing the individual steps of the fabrication process for obtaining a rigid system with the FAM (prior art);

FIG. 11 a schematic showing the individual steps of the fabrication process for obtaining a soft system with the FAM;

FIG. 12 a photograph of a customized experimental setup for characterization of adhesion systems;

FIGS. 13a to e schematics of the analytical model for the rigid adhesion system with different boundary conditions;

FIGS. 14 a & b calculated reaction force ($F_r$) profiles on a flat glass surface with respect to retraction distance ($z_r$) (FIG. 14a) and FIG. 14b a magnified view for the reaction force profile in the beginning of retraction;

FIGS. 15a & b characterization of the effective work of adhesion ($\omega_{ad}$) and adhesion stress ($\sigma_{ad}$) of the FAM for rigid and soft adhesion;

FIGS. 16a & b characterization of adhesion stress ($\sigma_{ad}$) of a single microfiber on the FAM for the soft adhesion system;

FIG. 17 shows Table 1 with detailed information on a number of characterization results in adhesion of the rigid and soft adhesion systems;

FIG. 18 shows Table 2 with further detailed information on a number of characterization results in adhesion of the rigid and soft adhesion systems;

FIG. 19 shows Table 3 detailing further information on the FAM;

FIG. 20 shows Table 4 detailing further information on the FAM; and

FIG. 21 shows Table 5 detailing further information on the FAM.

In the following the same reference numerals will be used for parts having the same or equivalent function. Any statements made having regard to the direction of a component are made relative to the position shown in the drawing and can naturally vary in the actual position of use.

Figure 1:
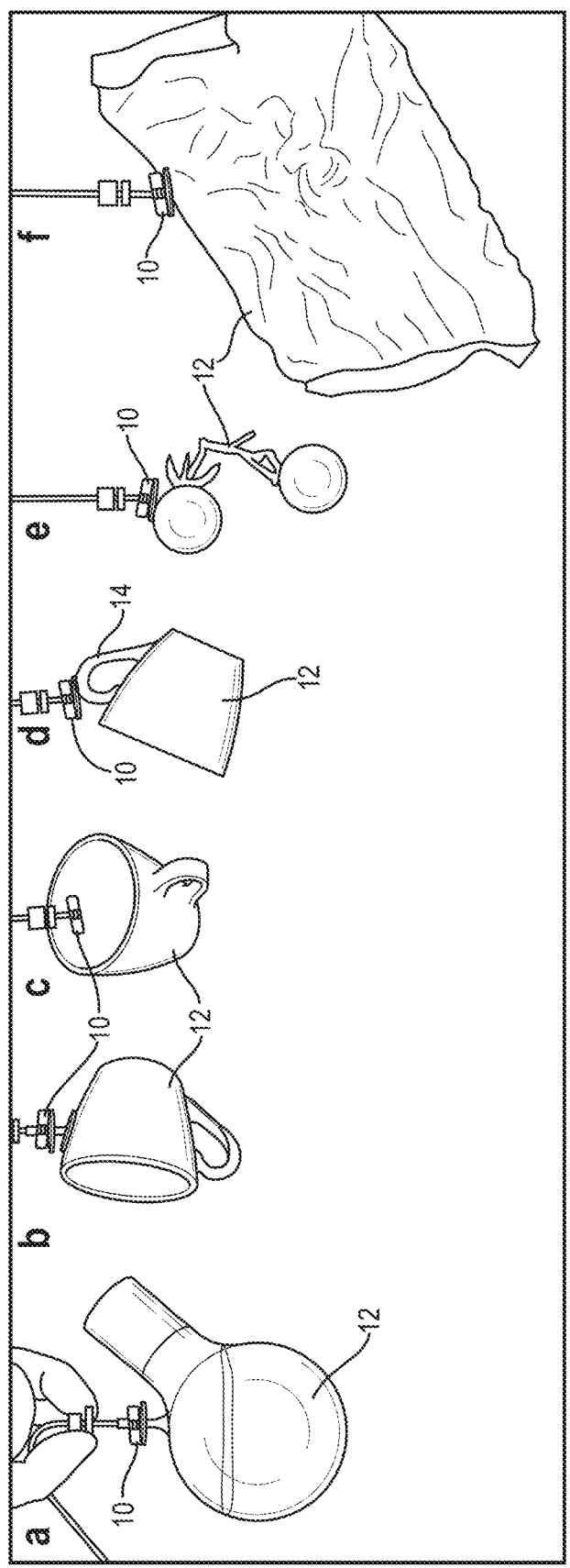

FIG. 1 shows a soft adhesion-based gripping apparatus 10 holding various 3D objects 12. FIG. 1a shows the gripping apparatus 10 holding a rounded glass flask filled with 200 mL of liquid (total weight of 307 grams). FIGS. 1b to 1d show various views of the gripping apparatus holding a 118 gram coffee cup used as an object 12 at different locations. In FIG. 1b the gripping apparatus 10 engages an outer surface of the coffee cup 12, i.e. a convexly shaped surface. FIG. 1c shows the gripping apparatus 10 engaging an inner surface of the coffee cup 12, i.e. a concavely shaped surface. FIG. 1d shows the gripping apparatus 10 gripping a handle 14 of the coffee cup 12. FIG. 1e shows the gripping apparatus 10 gripping a cherry tomato that is still attached to its vine which comprises two tomatoes weighing 41 grams in total. FIG. 1f shows the gripping apparatus 10 gripping a 139 gram plastic bag 12. The scale bar shown in FIG. 1 corresponds to 10 cm.

FIGS. 1a to f hence show that a control of an internal pressure of the gripping apparatus 10 enables an equal load sharing over a complete surface 12 (see FIG. 2) of a membrane 7 of the gripping apparatus 10. In this way the membrane 7 acts as a universal gripping interface that is capable of gripping a wide variety of different 3D surfaces ranging from convex to concave from smooth to, rough and from rigid to resilient and/or elastic.

The presented elastic adhesion gripping apparatus 10 increases adhesion to an object 12 through a combination of two fundamental mechanisms: (i) using a negative pressure differential to distribute the load more uniformly on the interface, and (ii) taking advantage of passive deformation of the elastic gripping apparatus 10 in response to the reduced chamber pressure, which can prevent the adhering membrane 7 from peeling away from the object 12 at a high negative pressure differential.

Thus, in accordance with the invention, the use of a pressure differential between the cavity and the environment has been found to be effective for enhancing the adhesion of a membrane-backed microfiber array on a wide range of curved geometries.

This is accomplished with the apparatus described for gripping actuation and does not require the introduction of additional hardware, including sensors and electronics. Experimental results show that pressure-controlled load sharing among the microfibers 8 (see FIG. 2a) in contact with the surface of the object 12 not only enhances adhesion but also leads to an area scaling law similar to that of the natural gecko's adhesive system. Such area scalability has not been observed in other microfiber adhesives and suggests that improved interfacial load sharing is critical when grasping an object 12 having a 3D non-planar geometry.

FIG. 2 specifically shows the gripping apparatus 10 of the invention, with a housing 5, a membrane 7, a cavity 18 between the housing 5 and the membrane 7, a silicone tube 1 forming a connection passage to the cavity 18, and a bond layer 2 of vinylsiloxane present between the membrane 7 and the housing 5 in the region of the periphery 9. An outer case 3 is also optionally present that engages a rubber ring 4 on the housing 5, to facilitate manipulation thereof.

Figure 2A:
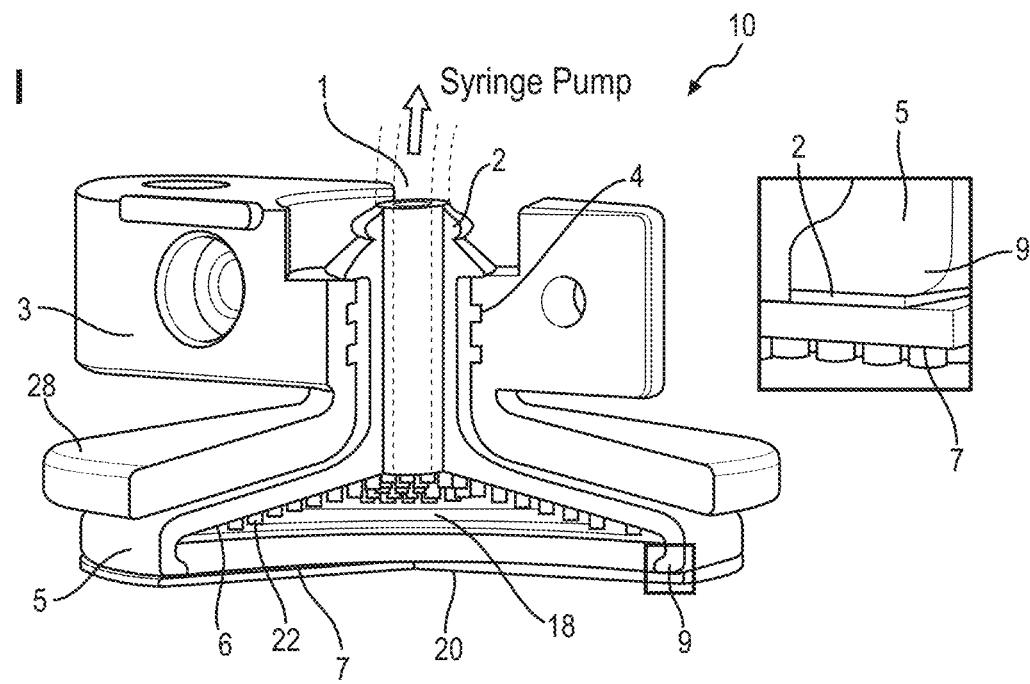
Figure 2A:
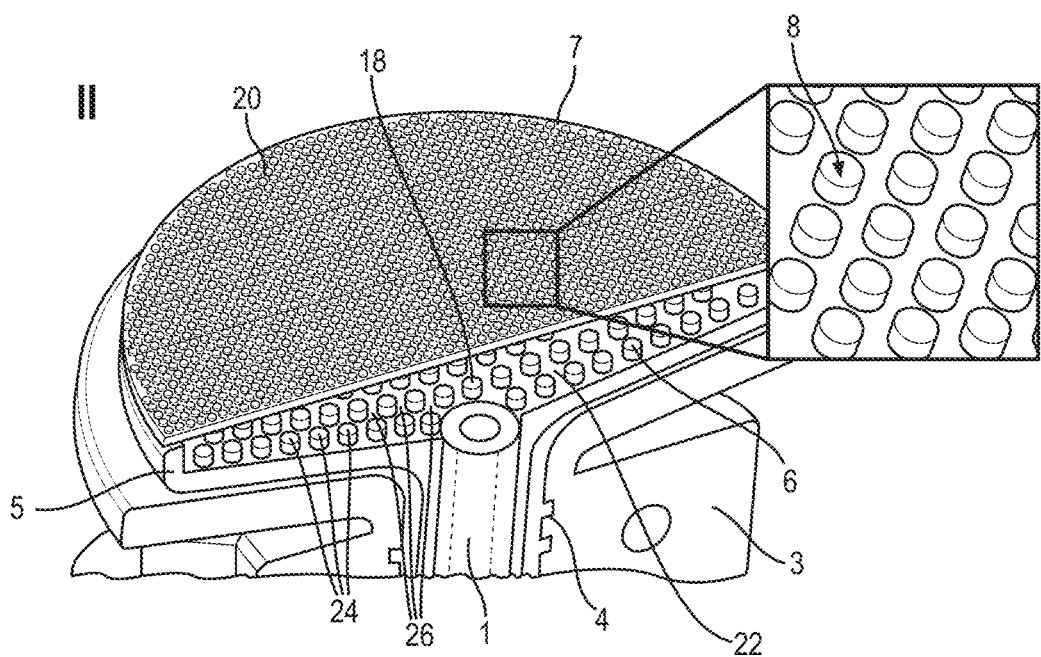

FIG. 2a(I) shows a part sectional schematic view of the gripping apparatus 10. The gripping apparatus 10 comprises the membrane 7 having islands formed thereon, with the islands being provided in the form of microfibers 8 that project from the surface of the membrane 7. The gripping apparatus 10 further comprises a flexible housing 5. The membrane 7 is fixedly connected to a periphery 9 of the housing 5. A cavity 18 is present between the membrane 7 and the housing 5. In order to be able to induce a negative pressure in the cavity 18 a connection to an air pressure regulator 4, in the present instance a syringe pump 4, is present that is connected to said cavity 18 in a gas conducting manner via a gas conducting passage 1.

Two basically distinct variants of the membrane 7 are conceivable, one in which no islands are required on the outer surface 20 of the membrane 7 and one in which the islands (projections) are present on the membrane 7, with the islands being able to be formed by pillars or by nano-bumps or otherwise.

A spacer structure 6 is present in the cavity 18. In the present instance the spacer structure 6 is attached to an inner surface 22 of the housing 5, with the inner surface 22 facing said membrane 7. In this example the spacer structure 6 comprises a plurality of cylindrical posts 24 (see FIG. 2a(II)) and spaces 26 are present between the cylindrical posts 24 and are also referred to as interconnecting channels 26. The spaces 26 formed between the cylindrical posts enable the negative pressure applied to the cavity to be uniformly distributed within the gripping apparatus.

FIG. 2a details structural features of the proposed soft adhesion gripping apparatus 20. A fibrillar adhesives on a membrane 7 (FAM) is supported by a soft, deformable chamber 5, which is connected to a syringe pump 4 to allow control of the system internal pressure (FIG. 2a-I). The soft gripper chamber 18 is 18 mm in diameter, 600 μm thick, and contains 400 μm diameter pillar-like internal spacers 26 made out of a soft and highly stretchable silicone elastomer. The soft chamber 18 is bracketed by a 3D-printed plastic outer case 28, ensuring evenly distributed preload over the whole contact area of the membrane 7.

Figure 9:
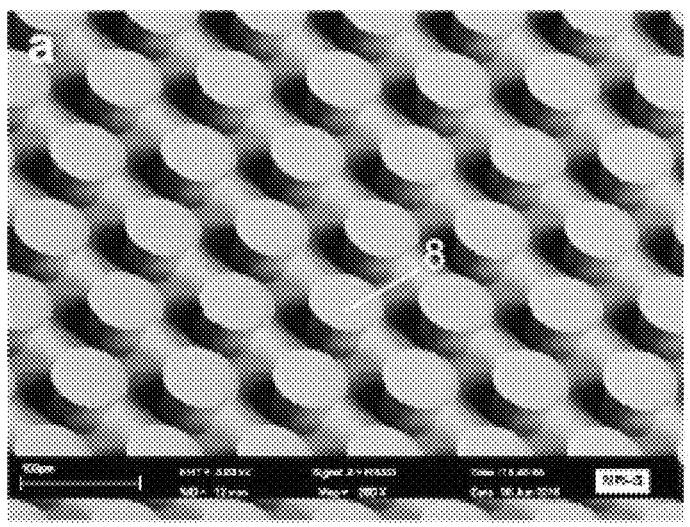
Figure 9:
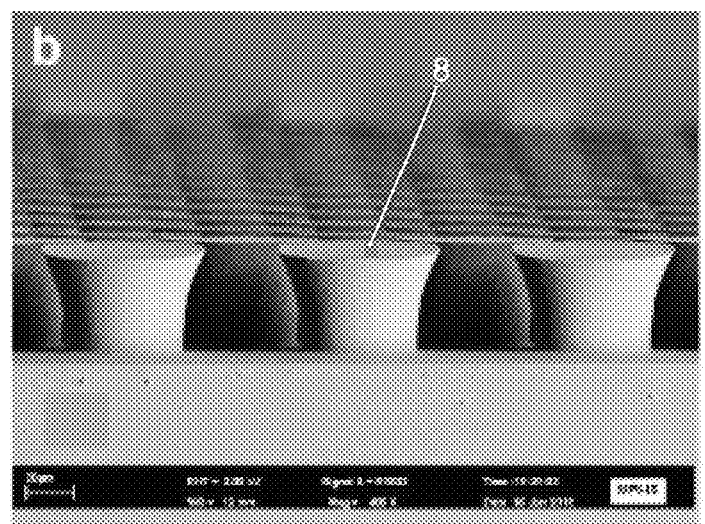
Figure 9:
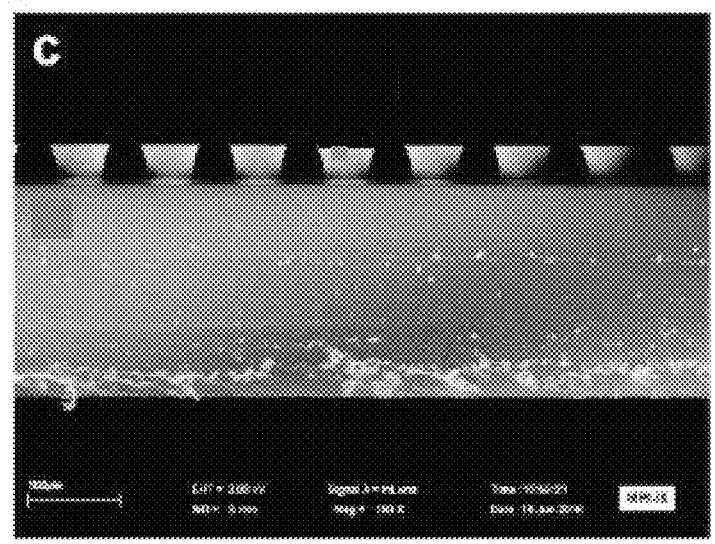

Each silicone component of the system is bonded using a vinylsiloxane (VS) elastomer. This means that the VS is provided in the region of the periphery 9 to ensure a sealing connection between the membrane 7 and the housing 5. The FAM 7 is composed of an array of vertically aligned, mushroom-shaped, polydimethylsiloxane (PDMS) microfibers 8 with 69 μm tip diameter, 31 μm spacing, and 42 μm height, supported by a thin PDMS backing layer with 250 μm thickness (FIGS. 8 and 9). Hence the housing 5 and the membrane 7 are made from the same material. It is also possible to dispense with the bond layer 2 and to integrally form the housing 5 and the membrane 7 e.g. in an injection molding process.

In this connection it is also possible that the membrane 7 and the housing 5 are formed from different materials also using a multi-stage manufacturing process.

In this connection it should be noted that the housing 5 and the membrane 7 can be made from the following materials, polymers, rubbers, composites, thermoplastic materials, Hydrogels, phase changing materials, shape memory materials, liquid materials, VS, PDMS, liquid crystal elastomers, elastomeric rubbers, silicone rubbers, polyurethane.

It should further be noticed that the membrane 7 and the housing 5 can have a Young's modulus selected in the range of 10 kPa to 600 MPa. In this way the material of the housing 5 and of the membrane 7 is a compliant material that has a flexibility selected to conform and/or adapt to the topology of the surface of the object 12 which the gripping apparatus 10 is intended to grip.

As shown in FIG. 2a-II, the microfibers 8 (FIG. 2a-II) cover the entire area of the membrane 7 and thereby provide a gap between the substrate 12 to which the gripping apparatus 10 is to be attached and the membrane 7, allowing air to travel substantially unhindered through the contact interface, preventing development of any suction that could contribute to the soft system adhesion. If, for example, the gripping apparatus is used to adhere to the skin of a person or animal then the skin can still breathe and perspire normally. The FAM 7 can be cleaned using a wet or dry process, allowing reliable and repetitive performance, which can otherwise be influenced with the buildup of dust, oil, or dirt.

As will be shown in the following the cavity 18 is configured to be evacuated in order to carry out a gripping function with the gripping apparatus 10. For this purpose the housing 5 and the membrane 7 are configured to conform to a shape at least substantially reflecting the shape of a surface of the object 12 to be gripped. It is preferred if the cavity is configured to be evacuated to a negative pressure differential for example preferably in the range from +10 kPa to −100 kPa or even up to −101.3 kPa with respect to the atmosphere pressure.

Preferably an at least substantially homogenous negative pressure differential is present within the spacer structure between the housing and the membrane.

In order to disengage the gripped object 12 the gripping apparatus 10, i.e. the cavity 18 can be supplied with a gas, typically air in order to be re-inflated to at least atmospheric pressure or even to a positive function in order to carry out a release of a gripping function of the gripping apparatus.

It should also be noted that voids are present between the islands, with a ratio of surface area of voids to a surface area of islands defining the density of islands on said membrane 7. In the present instance the islands formed as the shape of microfibers 8 are integral with the membrane 7.

It should also be noted that the islands have an aspect ratio selected in the range of $10^{-4}$ to $10^4$, preferably in the range of 0.01 to 1000, most preferably in the range of 0.1 to 10 and especially in the range of 1 to 5.

Figure 2B:
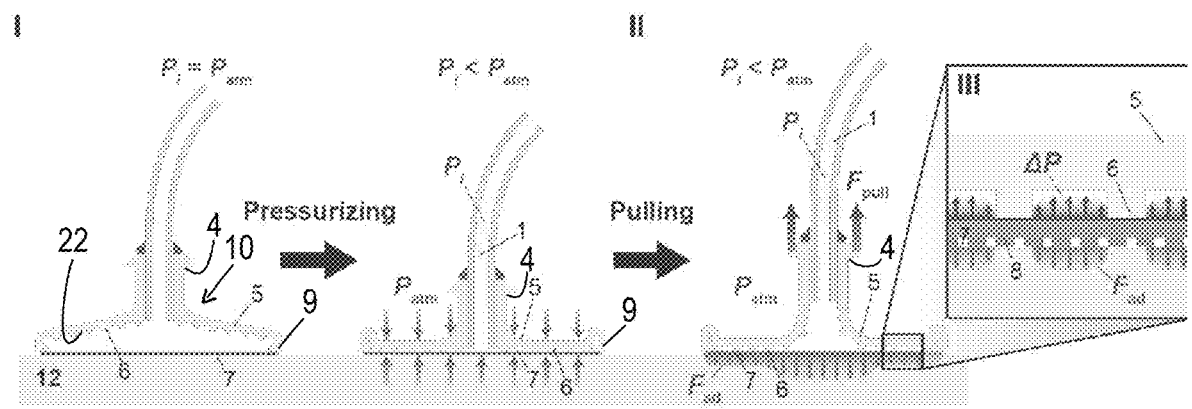

The effect of a negative pressure differential (ΔP) on the load sharing is shown in FIG. 2b. Here, the internal pressure ($P_i$) corresponds to the air pressure in the gripper chamber 18, tubing, and syringe pump and is always positive. The pressure differential is defined as the internal pressure in the cavity 18 less the atmospheric pressure ($P_{atm}$), and can be either positive or negative. Therefore, a negative pressure differential means that an absolute value of the internal pressure is lower than the atmospheric pressure (101.3 kPa).

Likewise, a high negative pressure differential indicates that the internal pressure is substantially lower than the atmospheric pressure. Under a high negative pressure differential, the atmospheric pressure forces the chamber 18 to collapse over the FAM 7 (FIG. 2b-I). This means that a shape of the housing 5 at least substantially conforms to the shape of the membrane 7 that in turn at least substantially conforms to the surface of the object 12 to be gripped by the gripping apparatus 10.

The spacers 24 in the chamber 18 (FIG. 2b-III6) ensure that the FAM 7 is exposed to the pressure differential even when the chamber 18 has collapsed (FIG. 2b-III). In contrast to typical adhesion systems that peel and exhibit poor adhesion under large deformations during pulling, the gripping system 10 benefits from deformation since it allows the spacers in the soft chamber 18 to lift up from the backing and exposes a larger area of the membrane to the negative pressure differential. This, in turn, enhances the load sharing by enabling the negative pressure differential to more uniformly distribute the interfacial tensile stress and improve bonding strength ($F_{ad}$) (FIG. 2b-II).

Figure 2C:
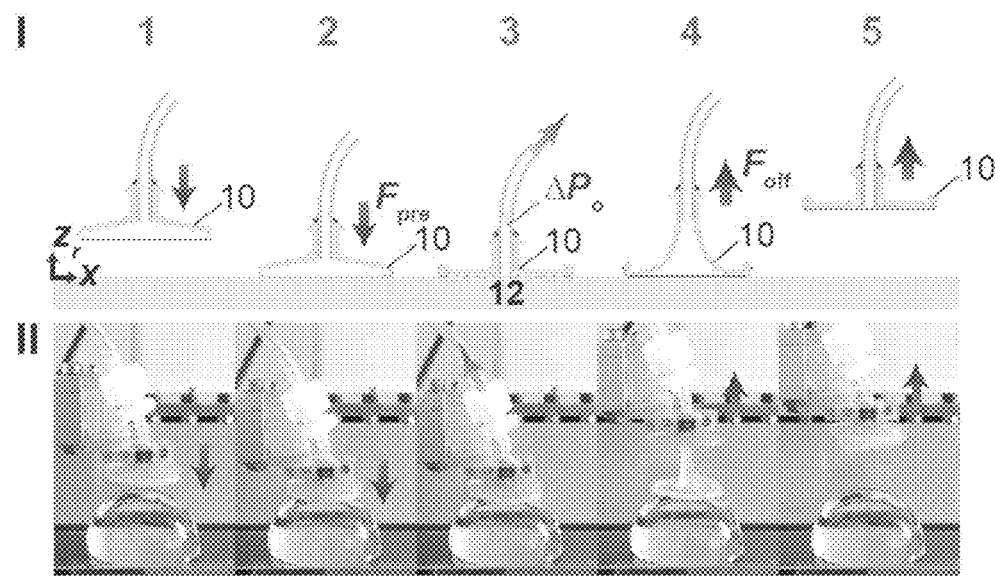
Figure 2C:
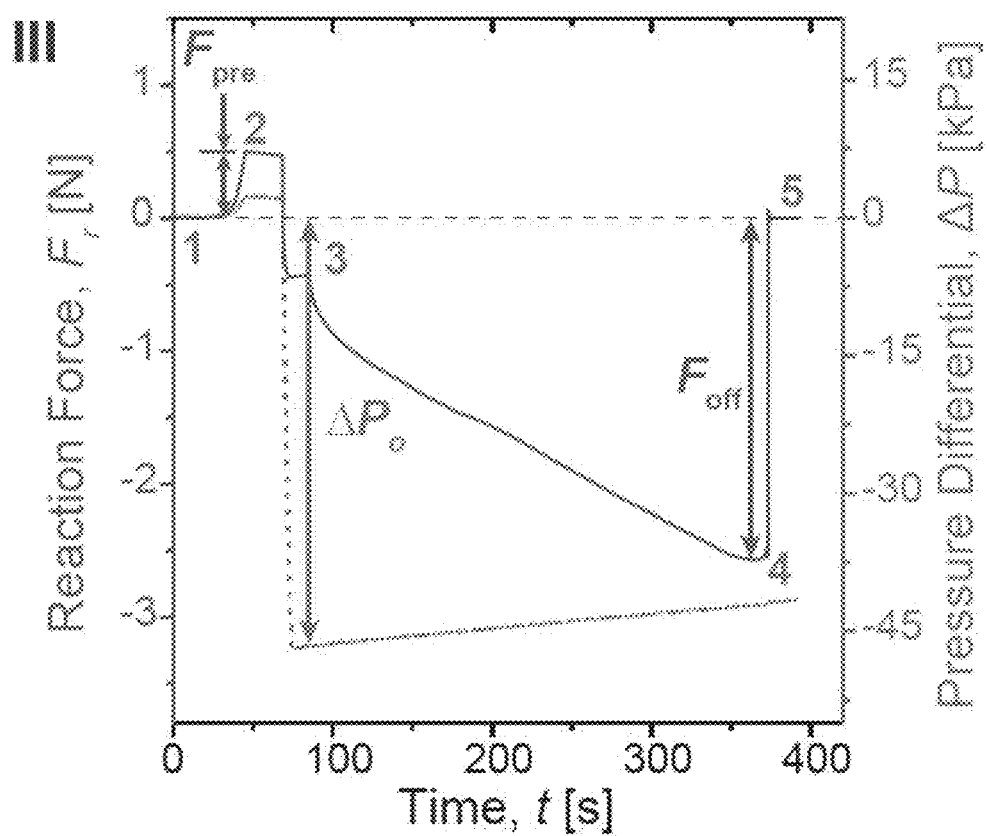

FIG. 2c show a representative force measurement of the soft adhesion system 10 with its corresponding force (straight with circle) and pressure (dashed with cross) curves. FIG. 2c-III gives reaction force ($F_r$) as a function of time (t). First, the soft adhesion system approaches a substrate (FIG. 2c-II) and is brought to contact (FIG. 2c-I2) with a compressive preload force ($F_{pre}$) induced at the interface. The preload is the maximum reaction force as shown in FIG. 2c-III, ranging from 0.5 N to 1.0 N depending on the substrate radius of curvature.

A negative pressure differential is applied to the inside of the soft chamber 18 during a pre-defined contact time, then the system is slowly retracted at 50 μm·s$^{-1}$ unloading speed to minimize possible viscoelastic effects on the adhesion. The pressure differential at the beginning of the retraction (FIG. 2c-I3) is defined as initial pressure ($ΔP_o$), which can be either positive or negative. The reaction force decreases during the retraction until it reaches the pull-off force ($F_{off}$) (FIG. 2c-I4), which corresponds to the minimum reaction force in FIG. 2c-II. The soft adhesion system 10 snaps off from the substrate 12 instantaneously after the pull-off force is reached (FIG. 2c-I5), as shown in FIG. 2c-III.

The principles of elasticity and stationary potential were used to examine the influence of internal pressure differential ($ΔP_o$) on the distribution of load among the microfibers 8' in contact with the surface 12 and to estimate the membrane 7 adhesion on curved surfaces 12. To develop a qualitative understanding of the load distribution among fibers, the axisymmetric array on the FAM is modeled using 2D plane-strain linear elasticity.

Figure 3:
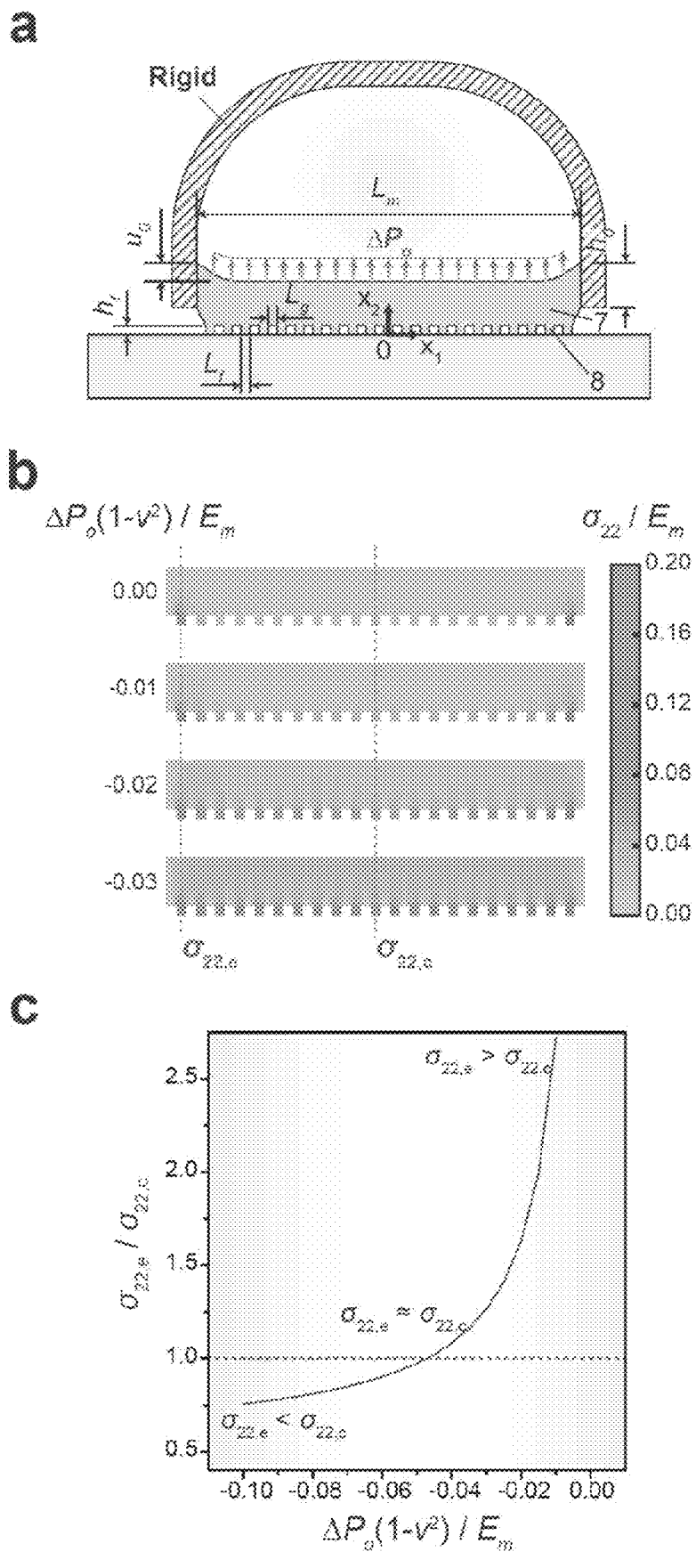

As shown in FIG. 3a, the FAM is simplified as an incompressible Hookean solid (Young's modulus $E_m$=2.1 MPa), which has a diameter $L_m$=2.15 mm and thickness $h_0$=250 μm. The edge of the FAM is subject to a vertical displacement ($u_0$) corresponding to 5% of its thickness. Each microfiber has a width $L_f$=50 μm, height $h_f$=50 μm, and spacing $L_g$=50 μm, and is assumed to remain in contact to the substrate with the prescribed loading conditions.

The governing Navier-Lame equations follow the standard displacement formulation for divergence-free stress within the Hookean solid and are presented in I discussed in the following. Of particular interest is the vertical stress $\sigma_{22}$ within the microfibers, which is normalized by the Young's modulus $E_m$. It is also convenient to define a normalized surface pressure $\hat{p}=(1-v^2)\Delta P_o/E_m$. In the absence of a negative pressure differential (i.e., $\hat{p}$=0), stress is concentrated in the outermost fibers when the edges of the membrane (thickness $h_0$) are lifted by the prescribed vertical displacement (FIG. 3b). Increasing the pressure leads to a more uniform stress distribution, with the vertical stress at the center fiber ($\sigma_{22,c}$) approaching the stresses at the edge ($\sigma_{22,e}$). Referring to FIG. 3c, the ratio $\sigma_{22,e}/\sigma_{22,c}$ steadily decreases and can even drop below 1.0 for a sufficiently high negative pressure differential. Although these results are based on 2D plane-strain elasticity, they nonetheless give qualitative insights on how negative pressure can be used to control the load distribution within the axisymmetric system.

An analysis based on the principle of minimum potential energy was used to investigate the influence of internal air pressure on membrane 7 adhesion to non-planar 3D geometries.

Figure 4A:
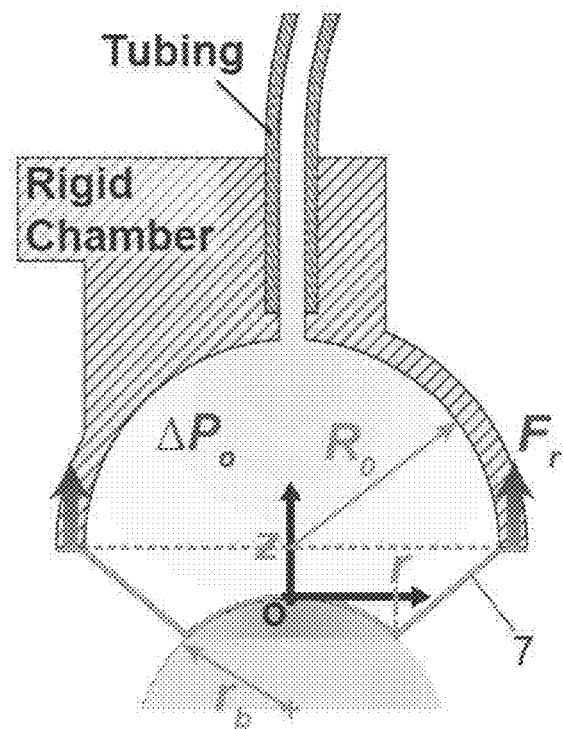

As shown in FIG. 4a, this rigid version of the adhesion system is composed of the circular FAM 7 supported along its edge by a hemispherical chamber. The chamber has the same 18 mm diameter, but slightly thicker wall of 1 mm, compared to the soft chamber 5. As with the soft gripper, the FAM 7 used for the rigid gripper is composed of PDMS and has a thickness of 250 μm. Examining this alternative system simplifies the analysis by eliminating the elastic deformation of the chamber and allowing us to instead focus on the deformation of the membrane. In particular, it enables us to examine the influence of various design parameters (e.g., membrane thickness and elastic modulus) and identify conditions that lead to more uniform load sharing control.

FIG. 4a shows a schematic of the rigid adhesion system being pulled off from a spherical substrate under a negative pressure differential ($\Delta P_o$). Arrows indicate the direction of reaction force ($F_r$).

As with the fiber array load distribution model, the purpose of the membrane adhesion theory is to establish a qualitative understanding of how negative differential pressure influences the interfacial mechanics. To further simplify the analysis, while still preserving the primary mechanics that govern adhesion, we make the following assumptions. First, the fibrillar interface is assumed to be a non-structured flat adhesive surface. Next, the elastomeric FAM 7 is assumed to be incompressible, has a uniform thickness over the entire area, and deforms into the shape of a truncated cone. These assumptions imply the principle stretches in the circumferential ($\lambda_\rho$), meridional ($\lambda_\varphi$), and thickness ($\lambda_t$) directions as: $\lambda_p=\sqrt{(z+r_b-\sqrt{r_b^2-r^2})^2+(R_0-r)^2}/(R_0-r)$, $\lambda_\varphi=1$, and $\lambda_t=1/\lambda_\rho\cdot\lambda_\varphi$. Such a simple geometry assumption for the deformed shape is reasonable for a membrane that is subject to a relatively low negative pressure differential ($\Delta P_o$) and high work of adhesion ($\omega_{ad}$). Here, $R_0$ is the radius of the FAM, which is 8 mm, $r_b$ is the radius of a curved surface, z is the vertical position of the rigid adhesion system with respect to the top of the curved surface where the origin (o) is located, and r is the contact radius at the given z (FIG. 4a).

Figure 4B:
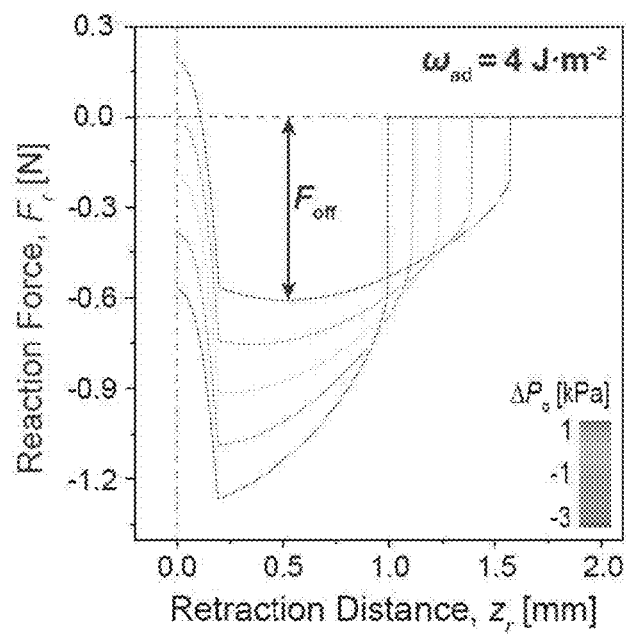

Details of the model are presented in Sec. II in the following. FIG. 4b shows the calculated profiles of reaction forces ($F_r$) between the rigid system and a flat glass substrate depending on different initial pressures with respect to retraction distance ($z_r$). Before the retraction (unloading) occurs, decrease in the internal pressure pulls the soft adhesion system towards the interface, which explains the initial negative reaction force in FIG. 4b. As long as adhesion of the FAM can sustain the applied internal pressure, the decrease in the initial reaction force can be estimated by the initial pressure multiplied by the actual contact area. This adhesion, however, is not due to any suction but instead arises from the uniform distribution of the interfacial load among the fibers in contact with the surface, as simulated in FIG. 3.

Figure 14:
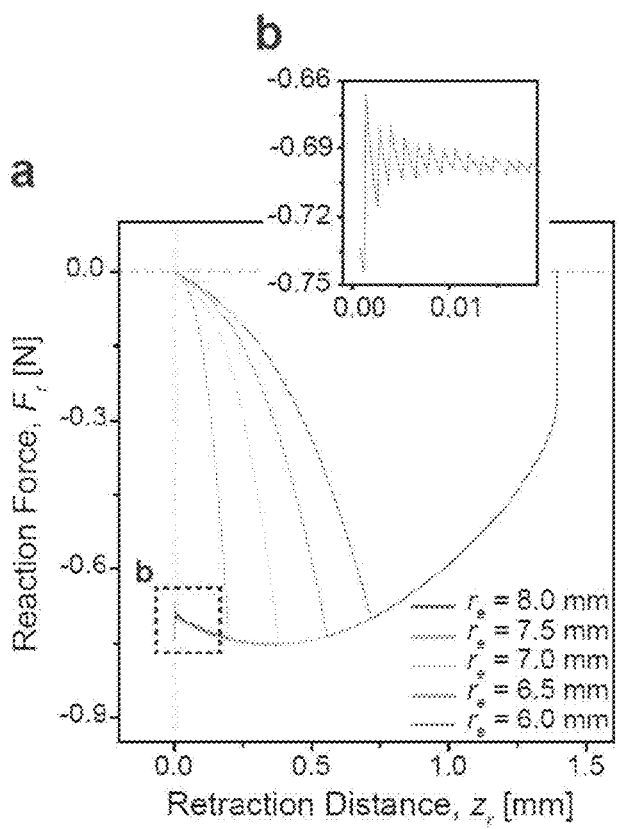

At the beginning of the retraction, the reaction force shows a significant drop until the edge of the FAM 7 in contact reaches its critical interfacial strength and starts peeling off. According to the presented model, the drop becomes less steep with a smaller initial contact area, requiring a longer retraction distance to reach the critical interfacial strength for peeling (FIG. 14). After transitioning through the dramatic decrease, the reaction force begins increasing in accordance with the peeling mechanics of the adhesive membrane, until the FAM is completely detached.

A higher negative pressure differential can result in higher pull-off force of the rigid adhesion system by distributing the load over the entire contact area more uniformly (FIG. 4b). Meanwhile, the negative pressure differential could accelerate detachment of the FAM 7 by additional tensile stress and a higher peeling angle caused by the deformation of the membrane 7 as it is pulled into the inner chamber of the rigid adhesion system (FIG. 13c). FIG. 4b shows the calculated reaction force ($F_r$) profiles on a flat glass surface versus retraction distance ($z_r$) for various initial pressures ($\Delta P_o$).

Figure 4C:
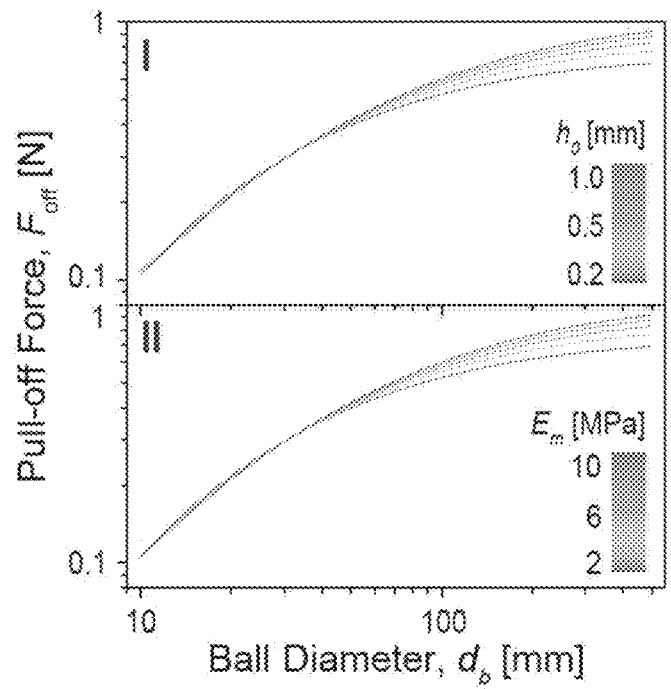
Figure 4D:
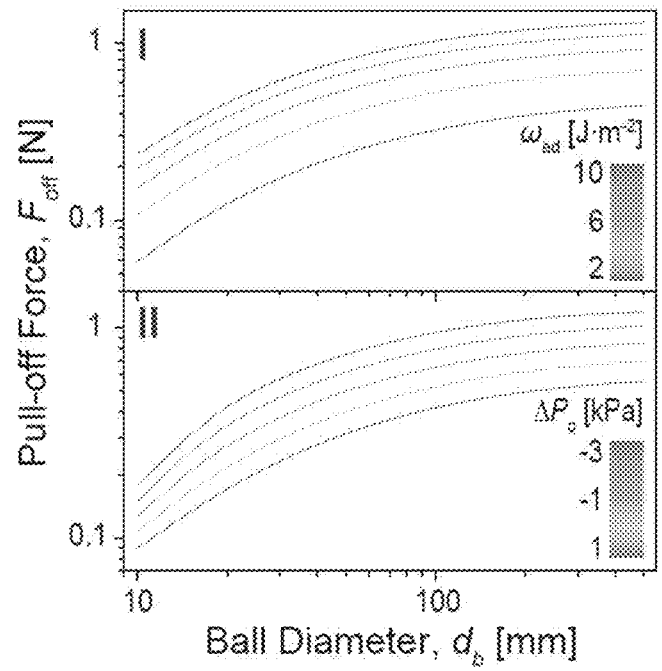

FIGS. 4c and 4d show calculations of the pull-off forces ($F_{off}$) on spherical glass substrates with diameters ($d_b$) ranging from 10 mm to 500 mm for various design parameters of the FAM. In particular FIG. 4c shows the calculated pull-off force ($F_{off}$) as a function of the diameter ($d_b$) of glass spheres for varying thicknesses ($h_0$) (I), and Young's moduli ($E_m$) (II). FIG. 4d shows the calculated pull-off force ($F_{off}$) as a function of diameter ($d_b$) of the glass sphere for varying works of adhesion ($\omega_{ad}$) (I) and initial pressures ($\Delta P_o$) (II). In all of these plots, the default parameter values are $h_0$=0.2 mm, $E_m$=2.1 MPa, $\omega_{ad}$=4.0 J·m$^{-2}$, and $\Delta P_o$=0 kPa. (e) Measured reaction force profiles on a flat glass surface with respect to retraction, depending on different initial pressures. (f) Measured pull-off forces on glass substrates with different curvatures depending on the initial pressures. Each point indicates an average of 5 measurements, and error bars are ±1 SD (standard deviation). The results indicate that its thickness ($h_0$) and Young's modulus ($E_m$) are not effective for increasing the pull-off force for small spherical geometries (FIG. 4c).

On the other hand, both the effective work of adhesion ($\omega_{ad}$) and negative pressure differential ($\Delta P_o$) could increase the pull-off force for all spherical geometries (FIG. 4d). Actively tuning the effective work of adhesion is often difficult once the membrane is fabricated. Potential methods for tuning include heating, electrostatic charging, or other forms of active stimulation. The analysis in FIG. 4d-II predicts that the adhesion can be doubled with respect to a decrease in the initial pressure by 4 kPa for the entire range of examined 3D surface curvatures.

Figure 4E:
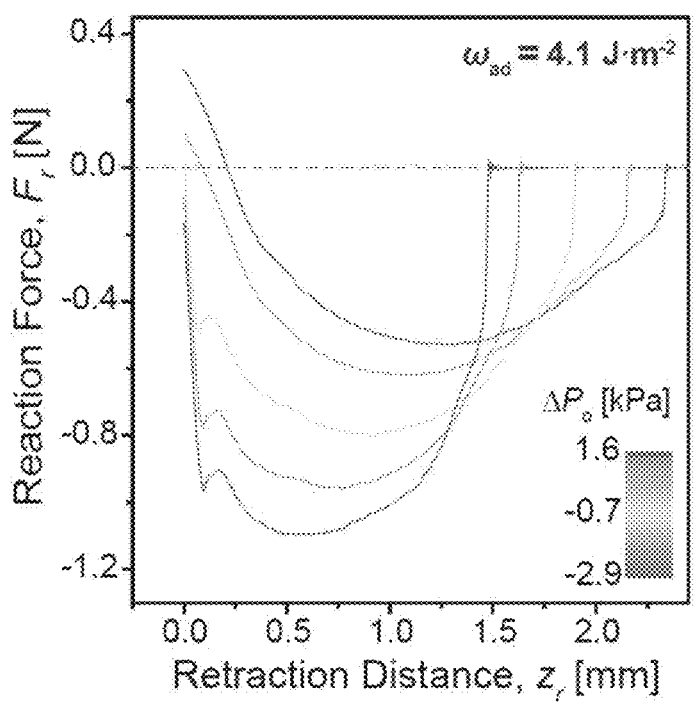
Figure 4F:
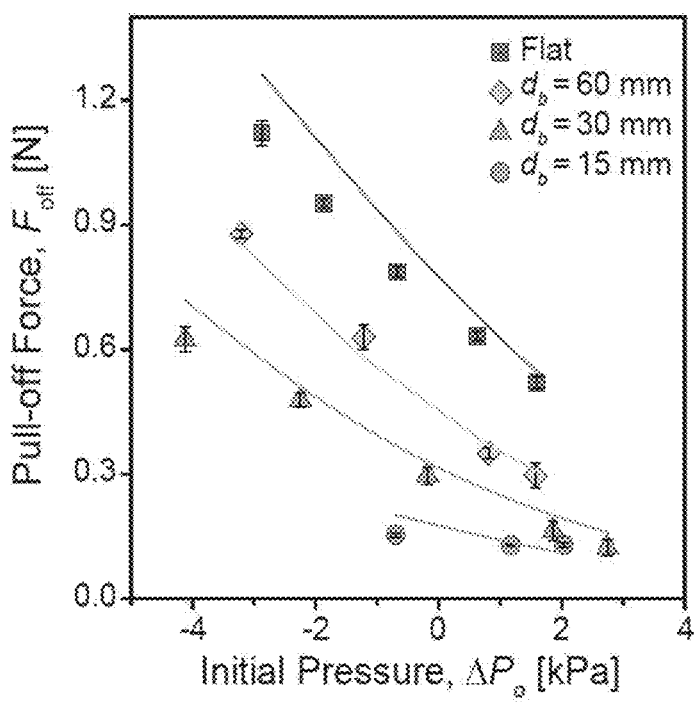

FIG. 4f shows the pull-off force of the rigid adhesion system for different initial pressures tested on flat and spherical glass substrates with 15 mm, 30 mm, and 60 mm diameter. The experimentally measured reaction force profiles for adhesion to the flat substrate are also presented in FIG. 4e. The effective work of adhesion of the FAM and corresponding adhesion stress were estimated to be 4.1 J·m$^{-2}$ and 101 kPa, respectively (FIG. 15b and Table 3 (FIG. 19)). Various initial pressures were applied depending on the spherical curvatures by means of volume changes in the syringe pump. The positive initial pressure is caused by compression of the system during preloading when no air volume is withdrawn.

The experimental reaction forces on the flat glass substrate 12 in FIG. 4e show reasonable qualitative agreement with the theoretical model (FIG. 4b) for the way the reduction in the initial pressure results in a higher pull-off force and shorter retraction distance for detachment. The measured pull-off forces in FIG. 4f are close to the theoretical predictions, shown as solid lines, with an average deviation of only 11% from the experimental results. The applicable maximum negative initial pressure was only −4.1 kPa on the glass sphere with 30 mm diameter, and became even smaller for the glass sphere with 15 mm diameter. For the latter case, the maximum negative pressure reduced to −0.7 kPa and corresponded to a small contact area and lower peel resistance, as shown in FIG. 4f. The pull-off force on the flat glass was increased by 2.2 times, while it was enhanced up to 5 times on the glass sphere with 30 mm diameter at maximum. We observed an only 1.2 times improvement in the pull-off force on the sphere with a 15 mm diameter.

The rigid system does show some benefit from a negative pressure differential in increasing interfacial bonding strength. However, a fully soft adhesion system exhibits an even more dramatic improvement by overcoming some of the limitations, when applying a high negative pressure differential for various non-planar 3D geometries. As shown in FIG. 2b-I, the deformation of the soft chamber 5 eliminates the unfavorable air pocket, allowing over −50 kPa of high negative pressure differentials for all examined substrates—15 mm, 30 mm, 60 mm in diameter glass spheres, a flat glass, and a soft elastomeric film with 400 μm thickness made out of Ecoflex® 00-30 (Smooth-On Inc.). This is approximately 10 times greater than the highest negative initial pressure possible with the rigid system. In particular, the FAM 7 on the soft adhesion system 10 remains in contact and enhances the adhesion to the 15 mm diameter glass sphere with a 70 times larger negative pressure differential.

Figure 5A:
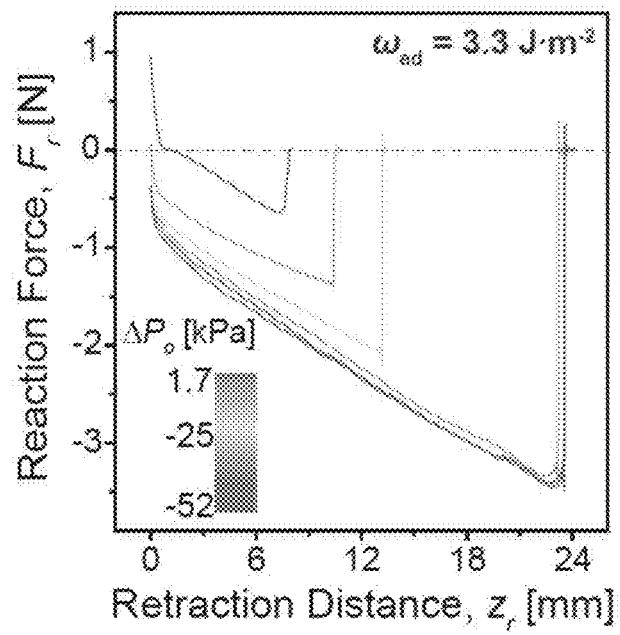
Figure 5B:
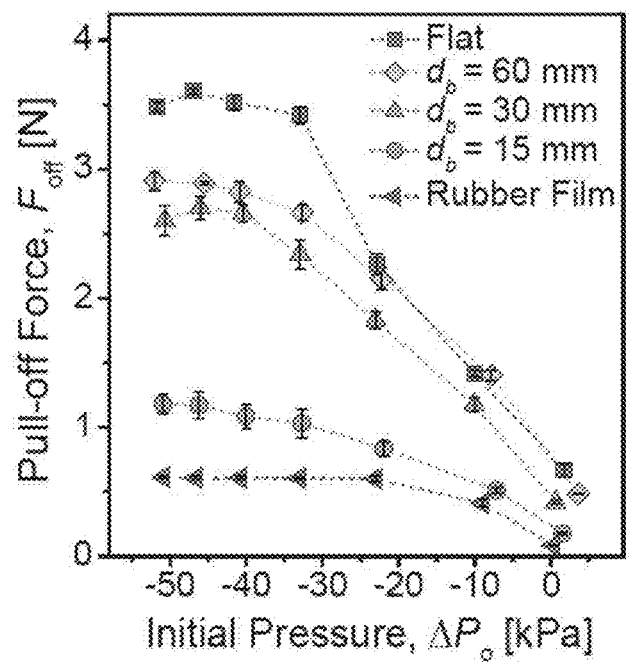

The FAM 7 of the soft adhesion system 10 is less adhesive than that of the rigid system, which exhibits an effective work of adhesion and adhesion stress of 3.3 J·m$^{-2}$ and 73 kPa, respectively (FIG. 15a and Table 4 (FIG. 20)). FIG. 5b shows the pull-off force ($F_{off}$) measurements of the soft adhesion system as a function of different initial pressures ($\Delta P_o$). In general, the pull-off force increases with $\Delta P_o$ and converges to a maximum when the pressure is between −40 kPa and −50 kPa. However, 90% of this maximum pull-off force can be achieved with a pressure differential of roughly −35 kPa. On the flat glass, the pull-off force of the soft adhesion system is increased by 5.4 times compared to the force without a high negative pressure differential. Of particular interest is the superior performance shown for highly-curved 3D geometries like the 15 mm diameter glass sphere, for which the pull-off force could be improved by 6.7 times. Even on deformable and stretchable substrates, where the FAM and many other adhesives easily peel off, the soft system could remain in contact under the high negative pressure differential and improve the pull-off force by a factor of 7.2.

Figure 5C:
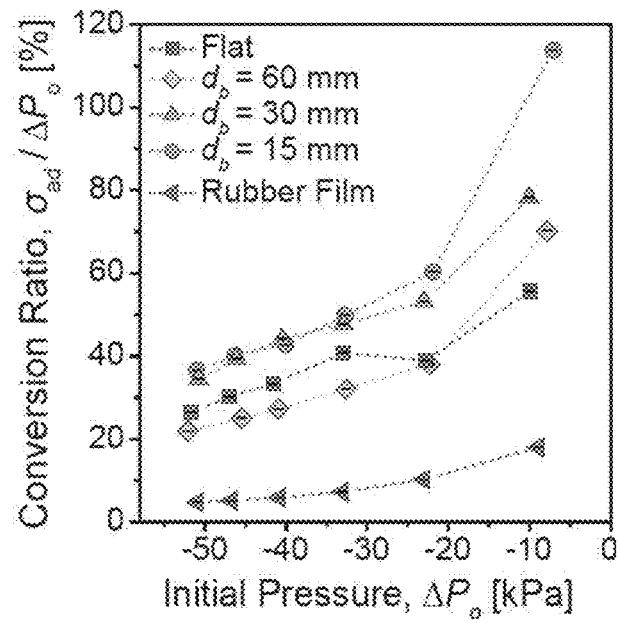

FIG. 5c shows conversion ratios ($\sigma_{ad}/\Delta P_o$) of the soft adhesion system on different substrates, defined as percentages of the adhesion stress ($\sigma_{ad}$) normalized by the applied initial pressure ($\Delta P_o$). The soft adhesion system exhibits high conversion ratios at low negative pressure differentials, as the microfibers on the FAM can still exert some adhesion without relying on the pressure differential. It shows even higher than 100% of the conversion ratio on 15 mm diameter spherical glass at −10 kPa.

At high negative pressure differentials, on the other hand, the conversion ratios decrease significantly, when the system cannot achieve the adhesion as high as the applied negative pressure differential. Among the different diameters of spherical glasses, the smaller sphere shows higher conversion ratios. In case of the same contact areas between the 60 mm diameter sphere and flat glass, the flat surface shows superior conversion ratios to the curved substrate.

In general, the soft adhesion system can achieve approximately 30-50% of the conversion ratio at −35 kPa of the initial pressure on glass. However, these values are highly dependent on the adhesiveness of the membrane. As already shown in FIG. 5b, the soft adhesion system cannot achieve as high an adhesion on the rubber film as it does on the glass substrates 12, with a conversion ratio well below 20% for all initial pressures. This leads us to the conclusion that the conversion ratios on the glass substrates would be higher if a more adhesive membrane was employed. Therefore, the maximum allowable adhesion of the present adhesion systems is fundamentally limited by the maximum adhesion strength of the fiber-surface contact interface. Nonetheless, negative pressure differential will change how the interfacial load is distributed among the microfibers 8 in contact with the surface and enhance adhesion performance within the limits of what the total sum of the contacts can support.

Previous microscale contact experiments have revealed that microfibers 8 with optimized tip-shapes show greater pull-off force due to equal load sharing, characterized by longer retraction distances for detachment accompanied with a fast crack propagation. The soft system achieves similar characteristics at the macroscale with 4 orders of magnitude larger contact area by improving the load sharing. Unlike the short retraction that accompanies the higher pull-off force of the rigid system, FIG. 5a shows that the present soft system could increase the pull-off force while delaying the detachment with a negative pressure differential.

FIG. 5 shows the characterization results of the soft adhesion system. FIG. 5a shows a schematic of the soft system completely collapsed on a flat glass substrate due to a high negative pressure differential (ΔP) and how the measured reaction force ($F_r$) profiles on a flat glass surface with respect to retraction, depending on different initial pressures ($\Delta P_o$). FIG. 5b shows the measured pull-off forces ($F_{off}$) on various substrates depending on the initial pressures. FIG. 5c shows the conversion ratio ($\sigma_{ad}/\Delta P_o$) on various substrates as a function of initial pressure. Each point in FIG. 5b and FIG. 5c indicates an average of 5 measurements, and error bars are ±1 SD. FIG. 5d shows schematics of the soft system being pulled off from the flat glass without a change in the internal pressure ($P_i$) (I), and under a high negative pressure differential (II).

Figure 5D:
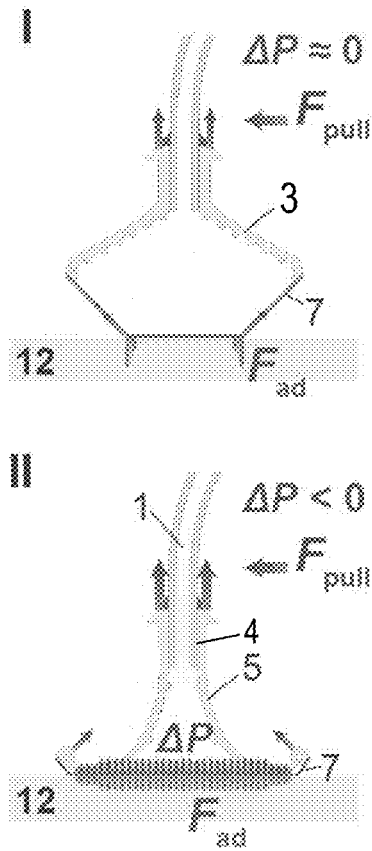
Figure 5E:
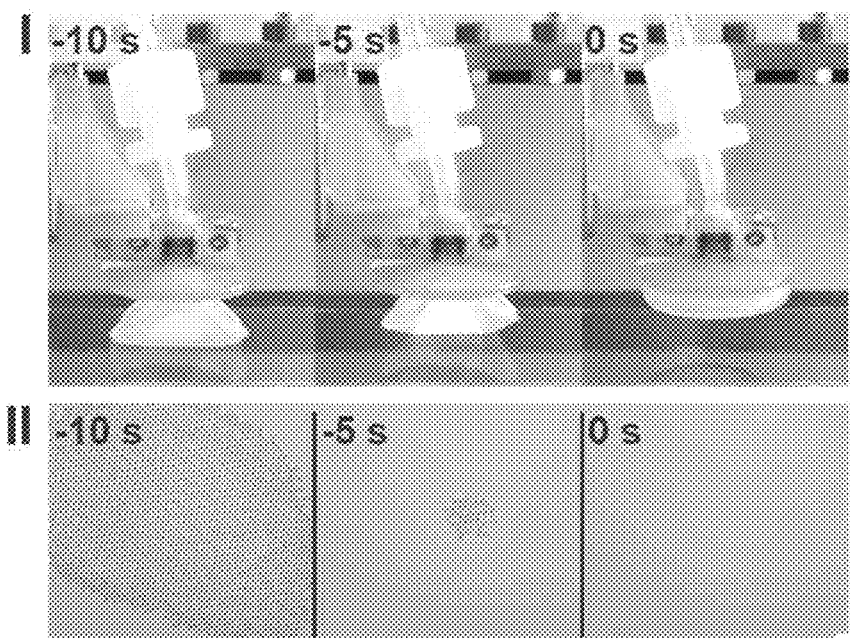

FIG. 5e shows side-views of the soft system 10 being pulled off from the flat glass 12 at 1.7 kPa of the initial pressure (I), and corresponding microscope images of the contact interface (II). The estimated crack propagation speed is 1.5 m·s$^{-1}$.

Figure 5F:
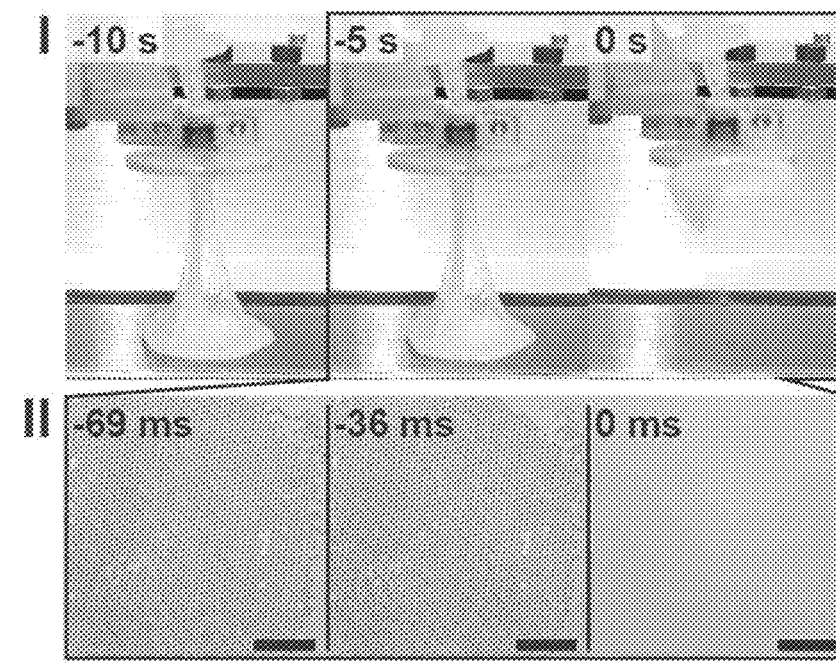
Figure 5G:
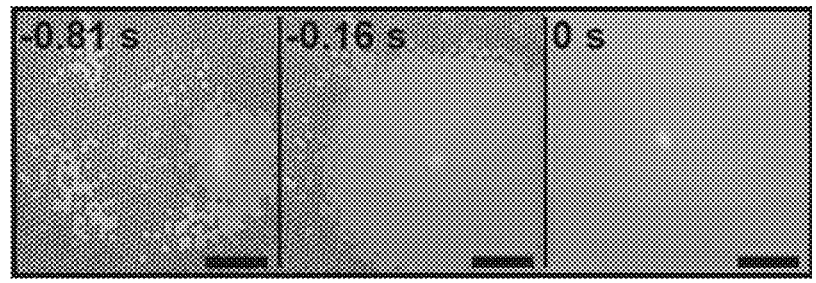

FIG. 5f shows side-views of the soft system 10 being pulled off from the flat glass 12 at −52 kPa of the initial pressure (I), and corresponding microscope images of the contact interface (II). The estimated crack propagation speed is 179 m·s$^{-1}$. FIG. 5g shows a microscope images of the contact interface of the soft system with a less adhesive FAM being pulled off from the flat glass at −46 kPa of the initial pressure. Scales in (e-II), (f-II) and (g) indicate 1 mm. The moment at which the FAM is detached is set to be zero seconds (0 s).

FIGS. 5d, 5e and 5f show schematics, side-view and microscope images of the soft system on flat glass interface, respectively. In the absence of the negative pressure differential, no collapse of the soft chamber occurs and the FAM experiences high stress concentration at the contact edge (FIG. 5d-I). This induces slow peeling from the interface (FIG. 5e-II) during a short retraction distance of 8 mm (FIG. 5a, FIG. 5e-I). On the contrary, the soft chamber collapses and strongly suppresses the peeling of the FAM at a high negative pressure differential, allowing the soft system to remain in contact for a 3 times larger retraction distance (FIG. 5f-I). At the moment when the soft system is pulled off, the extremely large stretch of the soft chamber causes a shear force higher than the critical shear stress, peeling is induced, and the FAM starts detaching from the contact edge (FIG. 5d-II). Since the equal load-sharing interface can withstand high tensile forces, a small loss in contact area can trigger an immediate detachment of the entire FAM (FIG. 5f-II). In this case, the crack propagation is roughly 110 times faster than without a negative pressure differential, strongly indicating the significant influence of equal load sharing.

Within the range of negative pressure differentials allowed by the presented experimental setup, the FAM 7 for the soft system always detaches from the contact edge. As shown in FIG. 5g, however, a similar amount of the negative pressure differential could cause a crack propagation initiated at the center when we used a less adhesive FAM 7 (effective work of adhesion and adhesion stress of 3.1 J·m$^{-2}$ and 56 kPa, respectively). The results in FIGS. 5e, 5f, and 5g show that the soft adhesion system 10 is able to manipulate crack initiation by changing the load distribution over a large area with the controlled pressure differential, as theoretically expected in the analysis shown in FIG. 3.

Direct comparison of the pull-off force between the soft and rigid adhesion systems cannot be made, as the FAMs on two systems have different effective principles of adhesion. In order to compare the performance of the rigid and soft systems with respect to load sharing, the adhesion efficiency ($\varepsilon_{ad}$) is employed, which is defined as the percentage of the adhesion stress of an adhesive system normalized by that of the microfiber array on the FAM 7.

If a load is equally shared over the entire interface until detachment, the adhesive system will reach the maximum adhesion stress of the microfiber arrays (i.e., $\varepsilon_{ad}$=100%). The rigid adhesion system could achieve only 6.6% of the maximum adhesion efficiency on the flat glass surface 12 under a negative pressure differential. If no air is removed from the chamber, then the efficiency drops down to 1.8% on a 60 mm diameter glass and the interface readily fails. The soft adhesion system, on the other hand, can utilize up to 19.5% adhesion efficiency on the flat glass. The system is even more effective for small and highly curved geometries where a full contact is not established. The maximum adhesion efficiency was approximately 25.7% on a 15 mm diameter glass, which is 14 times larger than the rigid adhesion system efficiency without the pressure control on non-planar surfaces.

More detailed information on the characterization results of the rigid and soft adhesion systems are presented in FIGS. 17 and 18, respectively. In FIG. 1, the reversible load sharing mechanism of the soft adhesion system is demonstrated as a soft adhesive pick-and-place gripper 10, enabling manipulation of various objects with complex 3D and deformable geometries. The soft adhesion system could conform to a convex (FIG. 1b) or a concave curvature (FIG. 1c), and provide a sufficiently high payload to support over 300 grams with 2.5 cm$^2$ of contact area (FIG. 1a). In FIG. 1d, the soft system can increase the adhesion on a highly curved geometry smaller than the FAM and lift up a weight as much as it could with the full contact in FIGS. 1b and 1c. Unlike gecko's biological foot-hairs, synthetic microfibers are highly sensitive to surface roughness, requiring very smooth surfaces like glass for high adhesion. However, the soft system can enhance the weak adhesion of the microfibers on slightly rough surfaces such as cherry tomatoes (FIG. 1e). The soft adhesion system is also successful for handling soft and deformable surfaces, which would not be possible for controllable adhesion mechanisms based on stiffness-tunable materials. As shown in FIG. 1f, the soft system remains in contact even when the object is deformed and effectively preserves the adhesive attachment during manipulation.

An ideally scaled up macroscale adhesion system would have no loss in adhesive force compared to their microscale counterparts. Equal load sharing plays a critical role in approaching ideal bonding conditions and maximizing load capacity over a prescribed contact area ($A_c$). Geckos have been used as a benchmark to judge the scaling efficiency of man-made adhesion systems. While shear stress ($\sigma_{sr}$) of the gecko's adhesion system, from bonding of a single seta to the attachment of two feet, has been reported to follow a scaling power law $\sigma_{sr} \propto A_c^{-0.24}$ on a flat glass surface, no conclusive estimate is available on the scaling law for pure normal adhesion stress ($\sigma_{ad}$), as adhesion of the gecko is strongly coupled with friction. It has been found that the gecko's scaling trend in adhesion coupled with shear forces is very similar to its scaling in shear stress for a range from the seta to the animal level. Therefore, the scaling of the gecko in the shear direction was taken as a standard to evaluate the scaling performance of the adhesion system in the adhesion stress, assuming the gecko would have similar scaling efficiencies in both lateral and normal directions.

Figure 6:
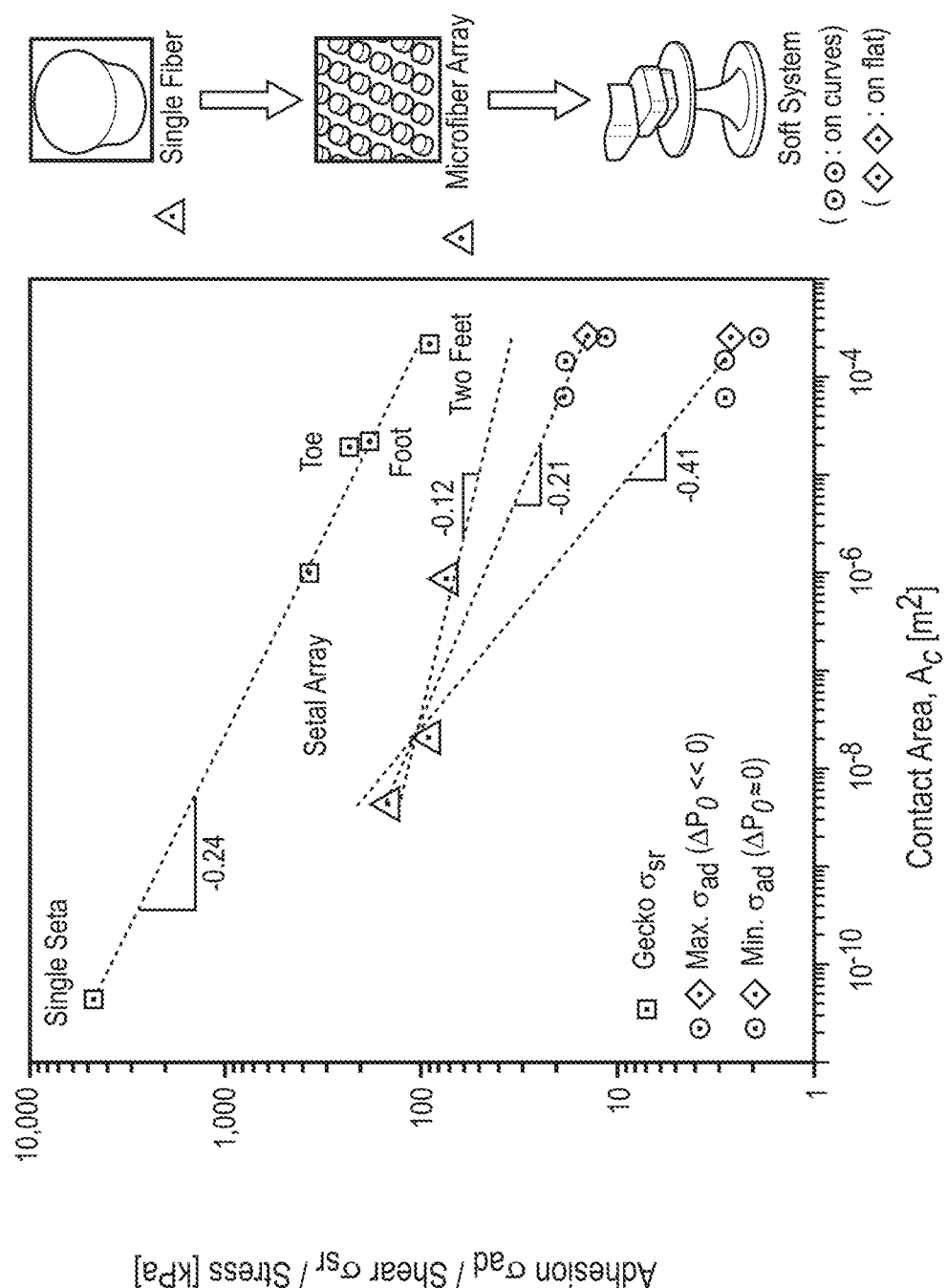

The adhesion stresses of a single fiber, a microfiber array, and the soft adhesion system on different sizes of spherical and flat glass substrates are plotted with the shear stress of the gecko foot-hairs, as shown in FIG. 6. Estimation of the adhesion stress of the single fiber and the microfiber arrays with a small contact area are detailed in FIG. 16 and Table 5 (FIG. 21). The scaling relation between the single fiber and the microfiber array, which are fixed on a rigid backing, is estimated as a power law of $\sigma_{ad} \propto A_c^{-0.12}$ by the least squares method, indicated as the dashed line a. This scaling relation provides a theoretical upper limit of the scaling efficiency that an adhesion system with the fibrillar adhesives could achieve at maximum.

Unlike the case of single fiber and microfiber array on a rigid backing, the adhesion stress of the compliant FAM 7 on the soft load sharing system 10 deviates from the linear trend of the theoretical maximum due to a significant loss in fracture strength by introducing stress concentration. The dashed lines b and c in FIG. 6 show the scaling trends of the soft system from the single fiber, microfiber array, and overall soft system calculated by the least squares method. Without a negative pressure differential (the dashed line c in FIG. 6), the stress concentration results in a poor scalability of $\sigma_{ad} \propto A_c^{-0.41}$. Under a high negative pressure differential (the dashed line b in FIG. 6), on the other hand, the soft load sharing system can minimize the stress concentration with the same compliant membrane and improves the scaling efficiency by recovering it up to a $\sigma_{ad} \propto A_c^{-0.21}$, which is slightly higher than that of the gecko on various flat and curved 3D surfaces.

FIG. 6 shows the scaling of the soft adhesion system 10 compared to a flat microfiber array and biological gecko adhesives. The scaling of gecko foot-hair adhesion is for shear stress ($\sigma_{sr}$) on a flat substrate, while the other results in the soft system are for normal adhesion stress ($\sigma_{ad}$) on both 3D curved (circles) and flat surfaces (rhombuses). Dashed lines a, b, and c are the least-squares trends in the adhesion stress of a single fiber, of the microfiber array, and of the soft system measured on the both flat glass and spheres with 15, 30, and 60 mm diameters with (dashed line b) and without (dashed line c) a negative initial pressure differential. The dashed line a is the scaling from the single fiber to the microfiber array. Each data point indicates an average of 5 experimental measurements.

A synthetic adhesion system was developed with the scaling efficiency related to $\sigma_{ad} \propto A_c^{-0.02}$ for the shear stress on flat or slightly curved surfaces. The soft adhesion system is the first man-made adhesion system having geometry-insensitive load sharing with an area scaling efficiency that is comparable to that of the natural gecko's adhesion system. Therefore, the concept of the soft adhesion system can provide significant benefits in a broad range of adhesion applications requiring high adhesion on various sizes of 3D surfaces. This includes transfer printing systems and robotic manipulators capable of handling a wide range of sizes and curvatures of rigid and deformable substrates as well as mobile robots that can climb on complex 3D surfaces, such as aircraft, space shuttle, or pipe surfaces.

While the soft elastomeric system possesses high 3D surface conformability, a large amount of stretch under a high load generates shear stresses at the edge of contact, causing a stress concentration. Using a soft but non-stretchable elastomer for the chamber may resolve this problem and further improve the performance. The presented work has focused on enhancing the adhesion capacity of a membrane 7 by equal load sharing, and there has not been an attempt to optimize the performance of the adhesion system 10 for releasing lightweight objects 12.

Previously the stretch of a membrane 7 was leveraged to peel the microfibers 8 in contact, reducing the bonding strength of the FAM down to the adhesion of a single fiber. Combining the proposed soft load sharing mechanism with the stretchable FAM 7 in the future, high load capacity and controllability may be achieved in adhesion with a controlled pressure differential. In the analytic model for the FAM 7, the structured fibrillar surface has been approximated as a flat surface and the shape of deformation has been simplified as a truncated-cone, even under a reduced internal chamber pressure. Taking the fibrillar structures into account along with more realistic kinematics of the membrane deformation would allow for a more quantitatively accurate predictive model. Such a model represents a potential opportunity for future work. In particular, it could lead to further insights into the contact mechanics of a soft and structured interface and be used in optimized soft system designs for specific applications.

Figure 7:
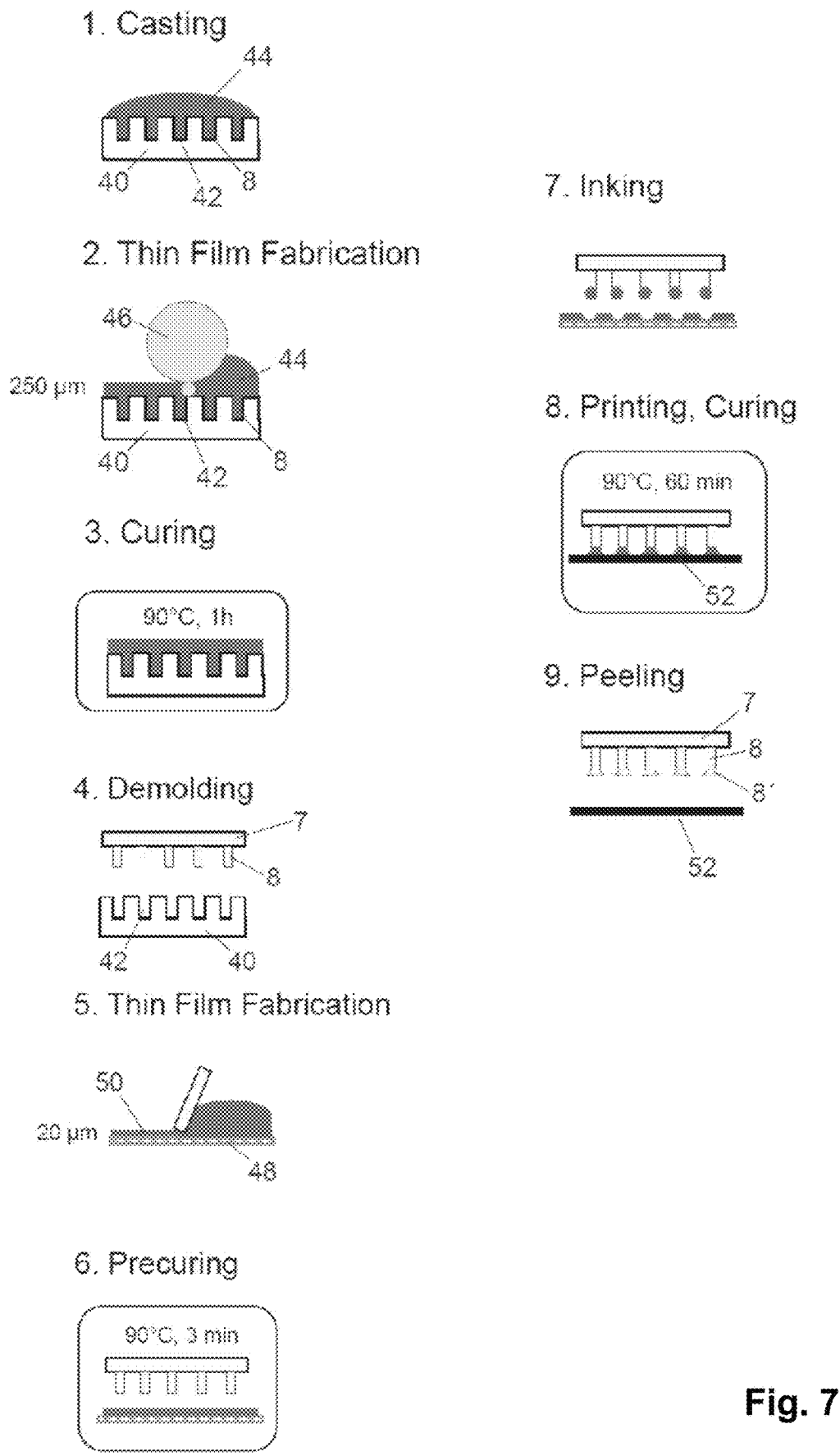
Figure 8A:
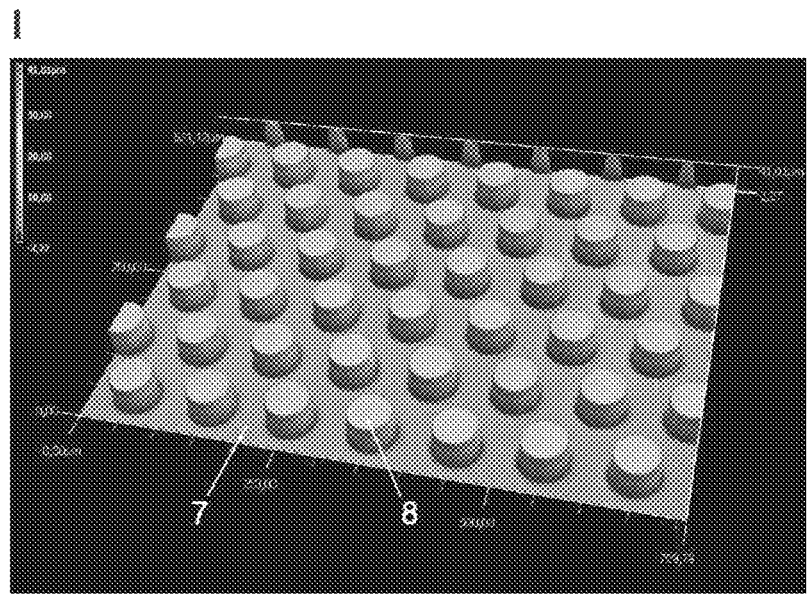
Figure 8A:
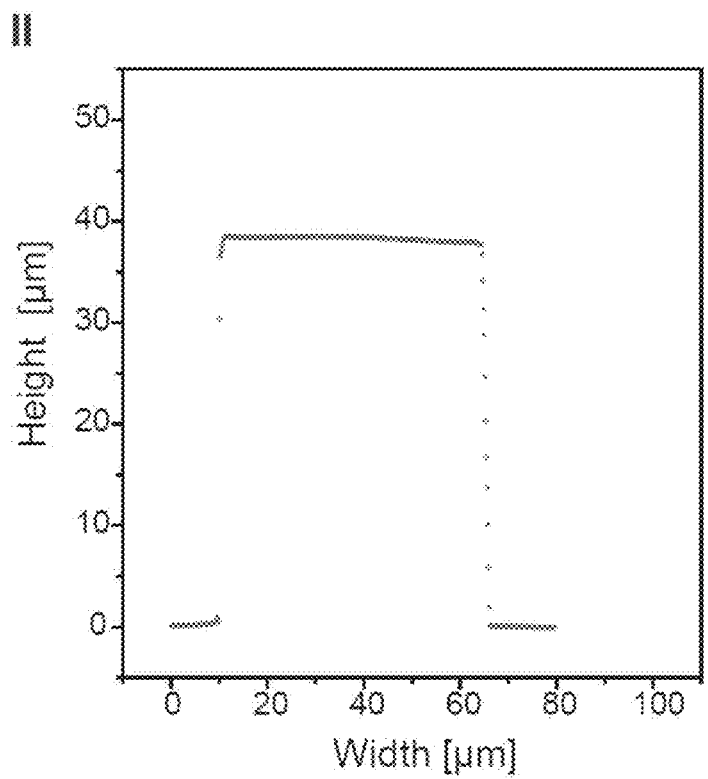
Figure 8B:
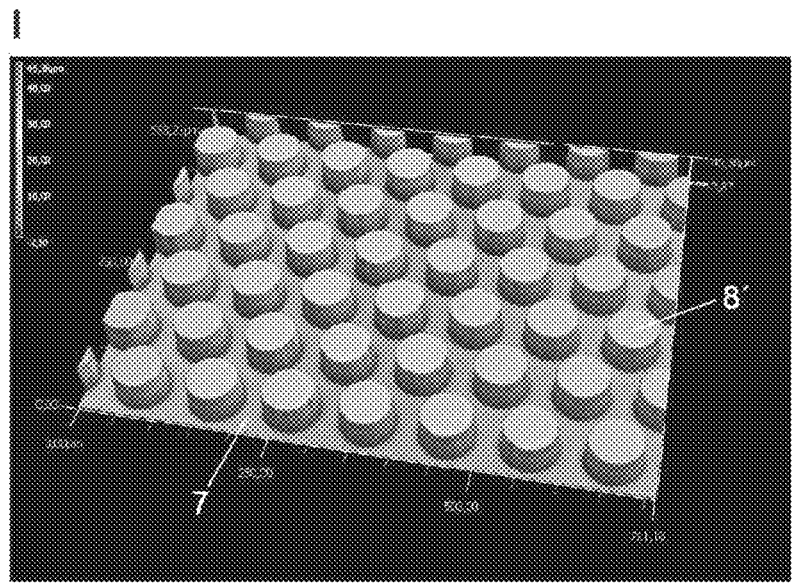
Figure 8B:
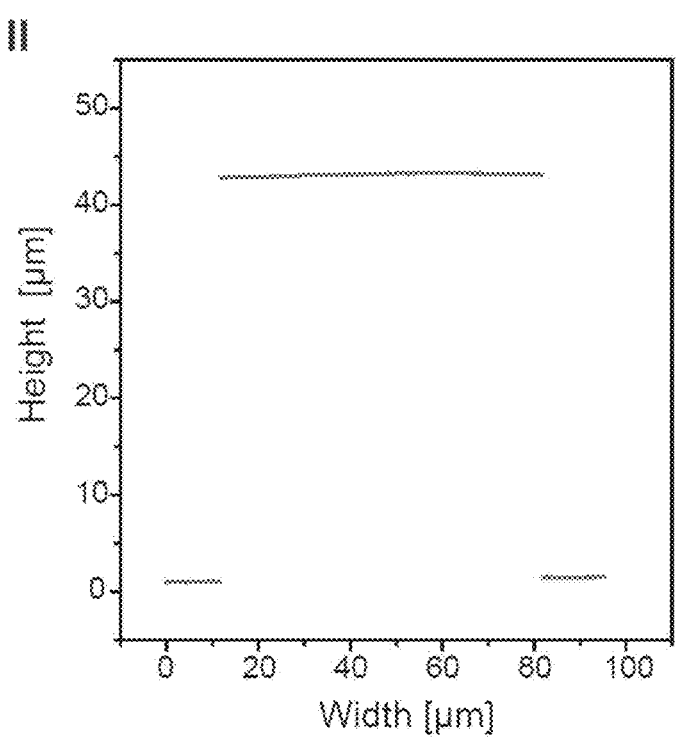

FIG. 7 shows the experimental procedure for fabricating the FAM 7. In a first step a mold 40 having cavities 42 formed therein is provided and PDMS precursor material 44 is distributed over this mold 40 in order to fill the cavities 42 to form the islands 8 in the cavities 42. Thereafter a thickness of the membrane 7 is defined by using a bar coater 46, in the present example it is 250 μm. The PDMS material 44 is then allowed to cure at 90° C. for 1 hour.

Thereafter the membrane 7 having the islands with the shape of microfibers 8 formed thereon is demolded. In order to increase the contact surface between the membrane 7 and the object 12 the tips of the islands can be provided with a layer of a material such as PDMS or VS, to form mushroom-head shaped islands. In order to form the mushroom-heads, a 20 μm thick film 50 of PDMS or VS is applied on a glass substrate 48 and the islands are introduced into the PDMS or VS in an inking process. The PDMS is allowed to partially cure for 3 mins at 90° C. prior to inserting the islands into the PDMS-ink 50 and coating these. Thereafter the PDMS-ink 50 covered islands are placed proximal to a silicon wafer 52 and finally cured at 90° C. for 60 min. On removing the membrane 7 from the wafer 52 the islands have heads formed thereon.

Soft PDMS molds 40 containing cylindrical cavities 42 were obtained by replicating SU-8 lithographic templates as previously reported. Sylgard® 184 siloxane base and curing agent were mixed in a 10:1 ratio, degassed and casted on the PDMS mold shaped in the cylindrical cavities. The excess prepolymer was removed by a bar coater (K-Hand-Coater, Erichsen GmbH & Co. KG) creating a ca. 250 μm thin backing layer. The sample was cured in a vacuum oven at 90° C. for 1 hour and demolded (FIG. 7). Micro-patterns with 52 μm diameter, 48 μm spacing and 38 μm height were received (FIG. 8). Sylgard® 184 prepolymer was poured on a glass plate and a thin film of ca. 20 μm thickness was created by a film applicator (Multicator 411, Erichsen GmbH & Co. KG). The thin polymer film was precured in the oven at 90° C. for 3 minutes.

FIG. 8 shows 3D scanned images of PDMS patterns and dimensions formed on the membrane 7. FIG. 8a shows a 3D image (I) and profile (II) of cylindrical PDMS patterns with 52 μm diameter, 48 μm spacing and 38 μm height. FIG. 8b shows a 3D image (I) and profile (II) of mushroom shaped PDMS patterns with 69 μm diameter, 31 μm spacing and 42 μm height. Note that the pillar stems of the mushroom shaped patterns cannot be measured since they are covered by the overhanging tips.

FIG. 9 shows SEM images of mushroom-shaped elastomer microfiber arrays 8 on the FAM 7. The top is shown in FIG. 9a and FIG. 9b shows a side-view of the mushroom-shaped microfiber arrays 8 with 69 μm in diameter, 31 μm in spacing, and 42 μm in height. FIG. 9c shows a side-view of the FAM 7 supported by a thin backing layer with ca. 250 μm in thickness.

Figure 10:
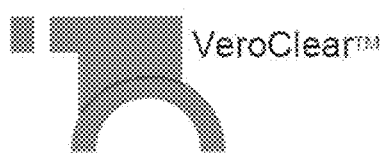
Figure 10:
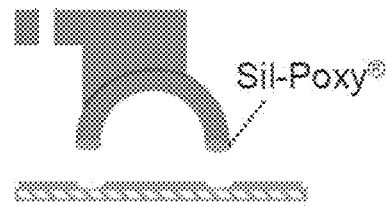
Figure 10:
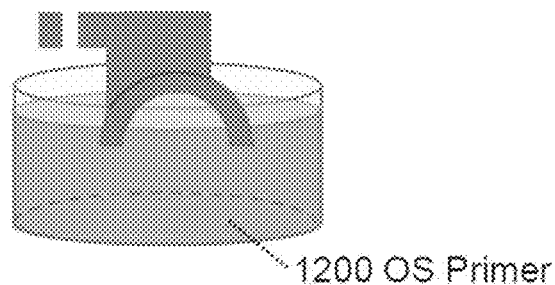
Figure 10:
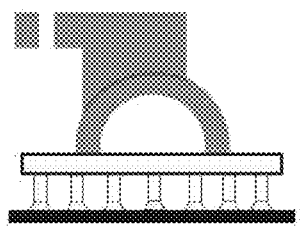
Figure 10:

FIG. 10 shows a prior art method of manufacturing a rigid adhesion system. For this purpose a FAM 7 as discussed in the foregoing can be used. The rigid chamber was designed with a CAD software (SolidWorks) and fabricated by a 3D printer (Objet260 Connex, Stratasys Ltd.) using Vero-Clear™ as the rigid material. The printed rigid chamber was thoroughly cleaned with 1 mol of NaOH solution in order to remove supporting materials. Surface modification on surface of the chamber was performed by inking the chamber into a primer (1200 OS Primer, Dow Corning®), followed by a drying step at room temperature for 30 minutes. The surface modification is important to ensure strong bonding between the chamber and the FAM.

A silicone adhesive (Sil-Poxy®, Smooth-On Inc.) was poured on a glass plate and a thin film of ca. 50 µm in thickness was created by a film applicator (Multicator 411, Erichsen GmbH & Co. KG). The chamber was inked into the thin Sil-Poxy® film and placed onto the FAM. After curing at room temperature for 30 minutes, the FAM was strongly bonded to the rigid chamber (FIG. 10).

Figure 11:
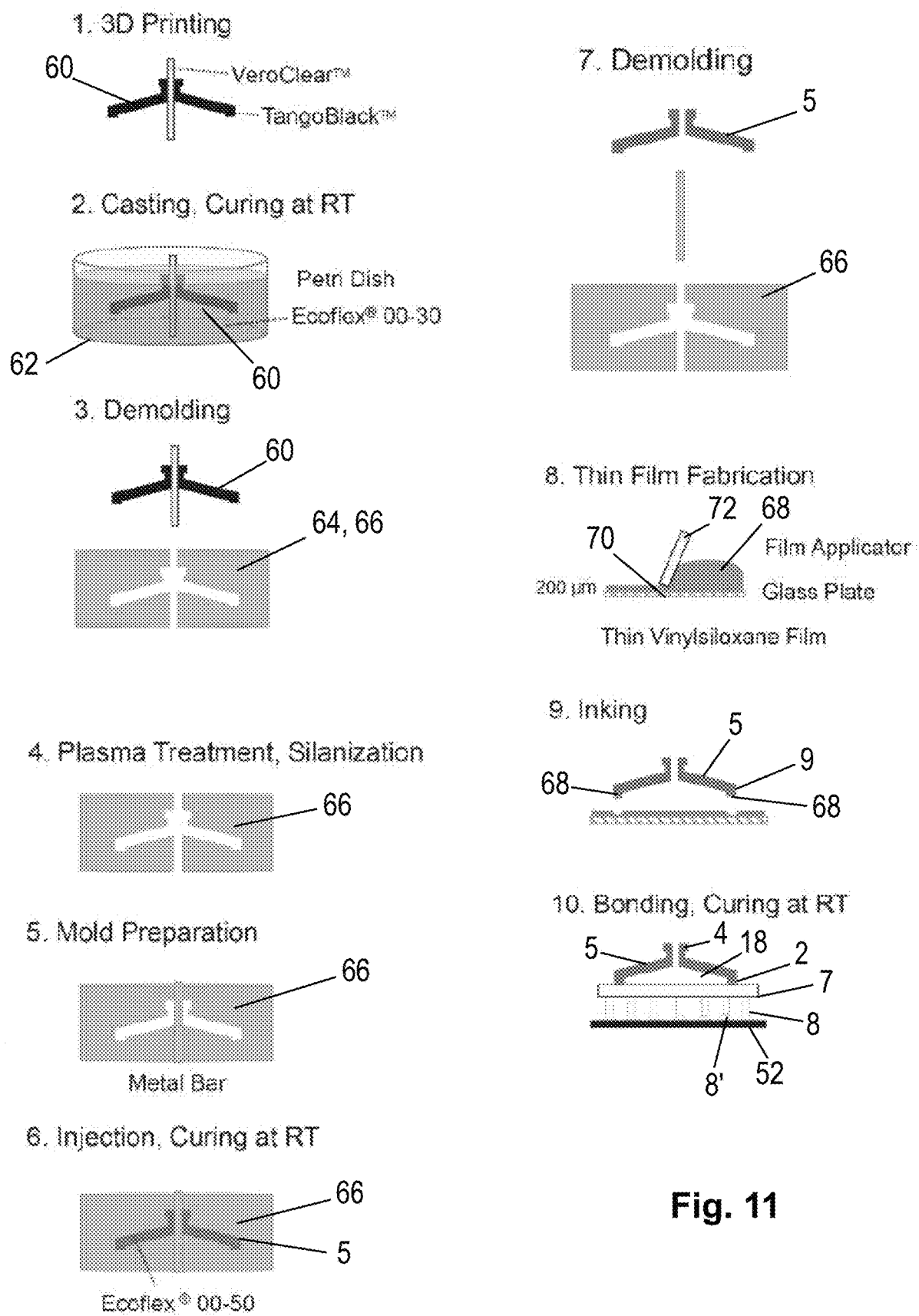

FIG. 11 shows the experimental procedure for fabricating the soft adhesion system 10. The schematic shows the individual steps of the fabrication process for obtaining a soft system 10 with the FAM 7.

The cylindrical fibers 8, fabricated in the previous step, were manually placed onto the precured thin PDMS-film 50 to cover the tips of the fibers 8 with PDMS-ink 50 and placed on a perfluorinated silicon wafer 52. The precuring of the polymer film is necessary in order to increase its viscosity and thereby enhancing the transfer of the polymer material to the fibers for creating optimal mushroom-shaped tips 8'. After curing at 90° C. for 1 hour, the printed patterns were carefully peeled off and the FAM 7 with µm tip diameter, µm spacing and µm height mushroom-shaped microfibers were obtained (FIGS. 8 and 9).

In order to produce the housing 5 a negative mold 66 made out of Ecoflex® 00-30 (Smooth-On Inc.) is obtained by replicating a 3D-printed composite model shaped as the chamber 18. The composite model 60 was designed with a CAD software and fabricated by a 3D printer (Objet260 Connex, Stratasys Ltd.) using VeroClear™ as rigid and TangoBlack™ as soft materials. The rigid axis grants stability to the model, while the soft body facilitates the peeling.

The printed chamber model 60 was thoroughly cleaned with 1 mol of NaOH solution in order to remove supporting materials. The chamber model 60 was fixed using a double-sided tape in a small plastic petri dish 62. A 1:1 ratio of Ecoflex® 00-30 prepolymer and crosslinker was mixed, degassed, and cast into the petri dish and cured at room temperature for 6 hours (FIG. 11). After the elastomer 64 was cured, the composite model 60 of the soft chamber 5 was carefully demolded.

The fabricated negative mold 66 of the soft chamber 5 was treated in an oxygen plasma at 100 W for 2 minutes, followed by the surface modification using Hexadecafluoro-1,1,2,2-tetrahydrooctyltrichlorosilane for 1 hour in vacuum and curing at 90° C. for 30 minutes. The perfluoro coating of the mold 66 is important to reduce the adhesion of the casting materials in the following replication process.

The mold 66 consists of two components, the soft negative of the chamber 5 and a thin metal bar used for a spacer to create an air channel 1 in the chamber 5 having the cavity 18 formed therein (FIG. 11). A 1:1 ratio of Ecoflex® 00-50 (Smooth-On Inc.) Parts A and B were mixed, degassed and injected inside of the negative mold 66 using a syringe. After curing at room temperature for 6 hour, the soft chamber 5 was carefully demolded from the mold 66.

A vinylsiloxane precursor 68 (Flexitime® Medium Flow, Heraeus Kulzer GmbH) was applied on a glass plate 70 and a thin film 74 of ca. 50 µm thickness was created by a film applicator 72 (Multicator 411, Erichsen GmbH & Co. KG). The periphery 9 of the soft housing 5 was dipped manually into the VS-polymer film 74 and placed on the FAM 7. The vinylsiloxane 68 produces a strong bond layer 2 between the soft chamber 5 and the FAM 7 after 5 minutes of curing at room temperature in the periphery 9 of the housing 5.

Figure 12:
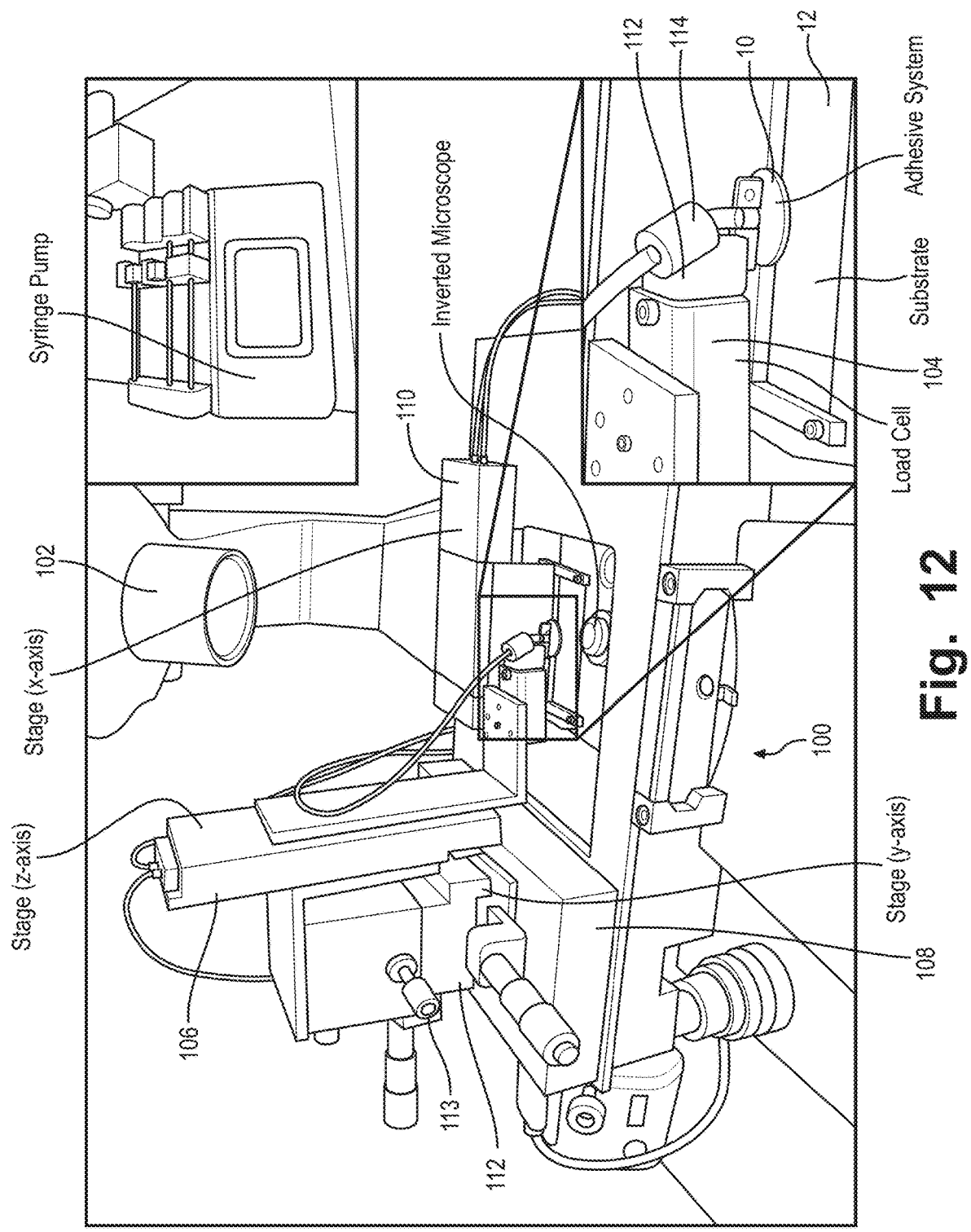

FIG. 12 shows the customized experimental setup 100 for characterization of adhesion systems. The customized adhesion measurement setup 100 was mounted on an inverted optical microscope 102 (Axio Observer A1, Zeiss) with a video camera (Grasshopper®3, Point Grey Research Inc.) to visualize and record the contact interface.

The reaction forces between an adhesion system 10 and a substrate 12 were measured by high-resolution load cells 104 (GSO-25, GSO-500, and GSO-1K, Transducer Techniques®). The load cell 104 was attached on a computer-controlled high-precision piezo motion stage 106 (LPS-65 2", Physik Instrumente GmbH & Co. KG) in z-direction, with a resolution of 5 nm and the maximum velocity of 10 mm·s$^{-1}$. A long range motor stage 108 (M-605 2DD, Physik Instrumente GmbH & Co. KG) was employed for y-direction with 1 µm resolution and high maximum velocity up to 50 mm·s$^{-1}$.

The substrate was fixed onto a sample holder 110 within the focal range of the microscope and moved in x-direction by the piezo stage 112 (LPS-65 2", Physik Instrumente GmbH & Co. KG). Also, fine positions in x- and y-direction were determined by a manual xy-stage 112 (NFP-2462CC, Positionierungstechnik Dr. Meierling). Angular misalignments were adjusted by two goniometers 113 (M-GON65-U, Newport) according to the substrate. A syringe pump 114 (Legato™ 210P, KDScientific Inc.) with an accuracy of ±0.35% was employed for pressure control inside of the adhesion system.

The motion of the piezo stages 106, 108, 110 and the data acquisition were performed by a customized code in Linux (Ubuntu™, Canonical Ltd.). The program allowed automated data acquisition and enabled the user to control velocities, pre-loads, displacements in x and z directions, and contacting time. The load cell 104 was connected to the computer via a signal conditioner (both not shown) (BNC-2110, National Instruments) and the force signal was exported as a voltage through a data acquisition board (PCIe-6259, National Instruments). Motion control of the piezo stages was conducted through a motor controller (Nexact® E-861, Physik Instrumente GmbH & Co. KG).

A numerical calculation was performed to obtain vertical stress ($\sigma_{22}$) within the FAM when pulling it up from a flat substrate under various differential pressures ($\Delta P_o$). The FAM is simplified as an incompressible Hookean solid whose dimensions and boundary conditions are detailed in FIG. 3a. The analysis is further simplified by modeling the axisymmetric system in 2D and assuming plane strain conditions.

The elastic deformation is represented by a displacement field $u=u_1(X_1,X_2)E_1+u_2(X_1,X_2)E_2$, where the Cartesian coordinates $X_1$ and $X_2$ and Euclidean bases $E_1$ and $E_2$ correspond to the horizontal and vertical directions, respectively. According to the Hooke's law, stress in the $E_1$-$E_2$ plane has components (1)

$$\sigma_{11} = \frac{E_m}{1-v^2}\left(\frac{\partial u_1}{\partial X_1} + v\frac{\partial u_2}{\partial X_2}\right), \quad [1]$$

$$\sigma_{22} = \frac{E_m}{1-v^2}\left(v\frac{\partial u_1}{\partial X_1} + \frac{\partial u_2}{\partial X_2}\right) \text{ and}$$

$$\sigma_{12} = \sigma_{21} = \frac{E_m}{4(1+v)}\left(\frac{\partial u_1}{\partial X_2} + v\frac{\partial u_2}{\partial X_1}\right).$$

At static equilibrium, the stress tensor σ must satisfy the balance law $\nabla\cdot\sigma=0$, where $\nabla=$ is the Lagrangian nabla operator. For 2D plane-strain elasticity, divergence-free stress implies the following form of the Navier-Lame equations:

$$\frac{\partial^2 u_1}{\partial X_1^2} + v\frac{\partial^2 u_2}{\partial X_1 \partial X_2} + \psi\left(\frac{\partial^2 u_1}{\partial X_2^2} + \frac{\partial^2 u_2}{\partial X_2 \partial X_1}\right) = 0 \text{ and} \quad [2]$$

$$\frac{\partial^2 u_1}{\partial X_2^2} + v\frac{\partial^2 u_1}{\partial X_2 \partial X_1} + \psi\left(\frac{\partial^2 u_2}{\partial X_1^2} + \frac{\partial^2 u_1}{\partial X_1 \partial X_2}\right) = 0,$$

where $\psi=(1-v)/4$. The solution to Eq. 2 must satisfy the following boundary conditions: $u_1=u_2=0$ where the membrane is in contact with the substrate, $u_1=0$ and $u_2=u_0$ at the membrane edges, $s_{22}=\Delta P_o$ along the top of the membrane, and $s \oplus n=0$ everywhere else, where n is the surface normal. The resulting boundary value problem is solved with the method of finite elements using the pdenonlin function in MATLAB (R2015a; Mathworks, Inc.).

Figure 13:
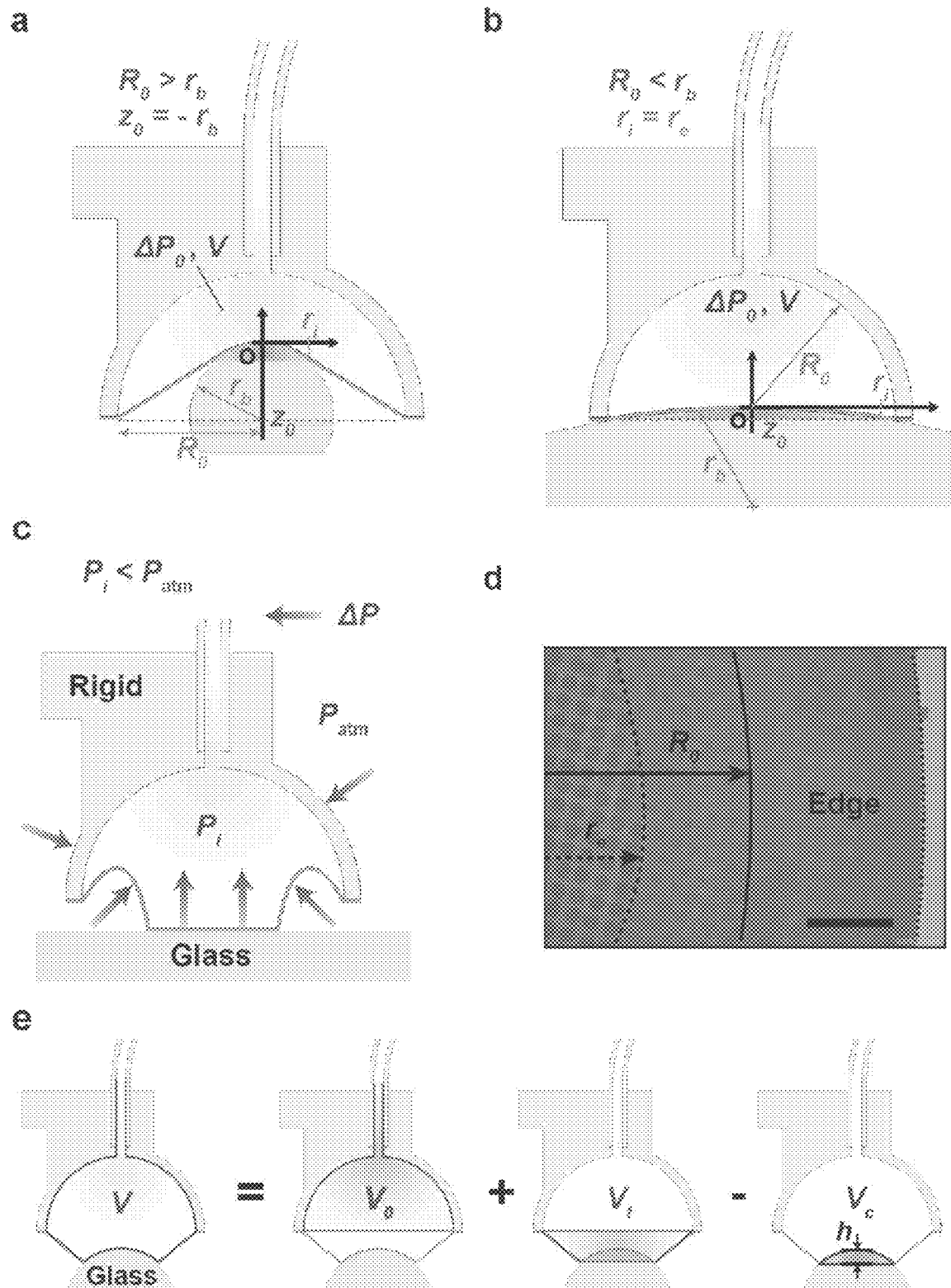

The FAM on the rigid system making contact with a spherical curved substrate is shown in FIG. 13. Additional boundary conditions and equations are employed to consider the mechanics of membrane adhesion on spherical substrates under a pressure differential. Initial boundary conditions for the vertical position of the system ($z_0$) and the contact radius ($r_i$) will be different depending on the size of the FAM with respect to the curved surfaces (FIG. 14). In the case that the spherical surface is larger than the adhesive membrane ($r_b \geq R_0$; FIG. 13b), the FAM achieves full contact prior to retraction, such that $$z_0 = -r_b + \sqrt{r_b^2 - R_0^2} \text{ and } r_i = r_e. \quad [3]$$

It should be noted that the position z is defined with respect to the origin and can be either positive or negative depending on the initial vertical position of the adhesion system ($z_0$) and retraction distance ($z_r$). Due to manufacturing imperfection and misalignment, the FAM on the rigid system could not often make full contact even on a flat substrate (FIG. 13d). We estimated from the experiments that approximately 700 μm from the edge of the FAM cannot make contact in average, which provides the maximum effective contact radius ($r_e$) to be 7.3 mm.

In the case when the spherical surface is smaller than the maximum effective contact radius ($r_b < r_e$; FIG. 13a), the FAM is assumed to be brought down to the center of the spherical substrate. The FAM wraps around the substrate, making conformal contact with the initial position and contact radius such that $$z_0 = -r_b \text{ and } r_i = \frac{r_b^2}{R_0}. \quad [4]$$

In experiments, the FAM could not be fully brought down to the center of the ball, as tensile stress may break the FAM during the preloading process. Instead, the system is brought down in contact until the preload reaches the predetermined value, which is in a range from 0.5 to 1.0 N. If the radius of a spherical substrate is in between the size of FAM and the effective maximum contact radius ($r_e \leq r_b < R_0$), the initial boundary conditions are $$z_0 = -r_b \text{ and } r_i = r_e. \quad [5]$$

During retraction, the FAM stretches due to adhesion, causing a volume change inside of the chamber (FIG. 13e). A volume in the shape of truncated cone deformation ($V_t$) subtracted with a volume of the spherical surface covered by the FAM in contact ($V_c$) increases the total volume (V) enclosed by the FAM in addition to the initial volume of the rigid adhesion system ($V_0$) as $$V = V_0 - V_c + V_t. \quad [6]$$

The initial volume ($V_0$) is the sum of the volume inside of the chamber, tubing, and syringe pump, which is approximately 7.2 mL. The volume inside of the truncated cone as well as the volume inside of the spherical cap covered by the FAM are $$V_c = \frac{\pi h}{6}(3r^2 + h^2) \text{ and } V_t = \frac{\pi}{3}(z+h)(R_0^2 + r^2 + r_0 r), \quad [7]$$

respectively, where $h = r_b - \sqrt{r_b^2 - r^2}$ is the vertical distance between the system and the top of the spherical surface.

The total potential energy (Π) of the FAM is calculated as a sum of elastic energy in a reference volume of detached area, adhesion energy of the membrane in contact, and work done by pressure can be modeled as $$\Pi(r,z) = \pi(R_0^2 - r^2)h_0 W_o(r,z) - \pi r^2 \omega_{ad} + U_p, \quad [8]$$

where $h_0$ is the natural thickness of the FAM and $\omega_{ad}$ is the effective work of adhesion. The effective work of adhesion is the total energy required to separate two contact interfaces, which is used for estimating the resistance to interfacial peeling. Assuming that the FAM can be modeled as a Neo-Hookean solid, the strain energy density function $W_o$ can be described as $$W_0(r,z) = \frac{E_m}{6}(\lambda_\rho^2 + \lambda_\varphi^2 + \lambda_t^2 - 3), \quad [9]$$

The work done by air pressure ($U_p$) is $$U_p = P_{atm}(V - V_0) - (P_{atm} + \Delta P_o)V_0 \ln\left(\frac{V}{V_0}\right). \quad [10]$$

The critical contact radius ($r_c$) at a given value of vertical displacement of the system ($z^*$) can be calculated as the solution of the following equation for static equilibrium.

$$\left[\frac{\partial \Pi(r,z)}{\partial r}\right]_{z=z^*} = 0. \quad [11]$$

By knowing the critical contact radius for different values of the vertical displacement which ranges from zero retraction distance ($z_r$) until the FAM is pulled off, the reaction force ($F_r$) can be calculated by taking the first partial derivative of the total potential energy (Π) with respect to the given vertical displacement ($z^*$) and substituting the contact radius (r) with the critical contact radius ($r_c$) as $$F_r(z^*) = \left[\frac{\partial \hat{\Pi}(r,z)}{\partial r}\right]_{z=z^*} = \frac{\partial \Pi(r_o z^*)}{\partial z}. \quad [12]$$

FIG. 13 shows the schematics of the analytical model for the rigid adhesion system with different boundary conditions. FIG. 13a shows a schematic of the rigid adhesion system in contact bigger than a spherical substrate. FIG. 13b shows a schematic of the contacting rigid adhesion system with a diameter that is smaller than that of the spherical substrate. FIG. 13c shows a schematic of the rigid adhesion system being delaminated from a flat glass substrate under a negative pressure differential ($\Delta P$). Arrows show the forces caused by the pressure differential acting on surface of the adhesion system, which can pull the FAM into the rigid chamber and cause delamination of the membrane. FIG. 13d shows an inverted optical microscope image of the FAM 7 on the rigid adhesion system in contact with a flat glass substrate, visualizing the contact interface. Dark areas indicate microfibers on the FAM in contact. The scale bar is 500 µm. FIG. 13e shows a schematic of the total volume (V) as a sum of the initial volume ($V_0$) and the additional volume created by the truncated-cone shaped deformation of the FAM ($V_t$), subtracted by the volume of the spherical substrate covered by the FAM ($V_c$). h is the height of the spherical cap ($V_c$).

FIG. 14a shows calculated reaction force ($F_r$) profiles on a flat glass surface with respect to retraction distance ($z_r$), depending on effective contact radius ($r_e$). Here, the difference in the effective contact radius represents the difference in the initial contact area. FIG. 14b shows a magnified view for the reaction force profile in the beginning of retraction when $r_e$=8.0 mm. Small numerical instabilities can be observed in the beginning of retraction when $r_e$=$R_0$. The first derivatives of the total potential energy ($\Pi$) with respect to vertical displacement (z) and contact radius (r) are numerically obtained using the forward ($r_e$=$R_0$), centered (0<$r_e$<$R_0$), and backward ($r_e$=0) difference approximations. Here, the vertical displacement and contact radius are discretized in 20,001 and 50,001 elements, respectively.

Figure 15:
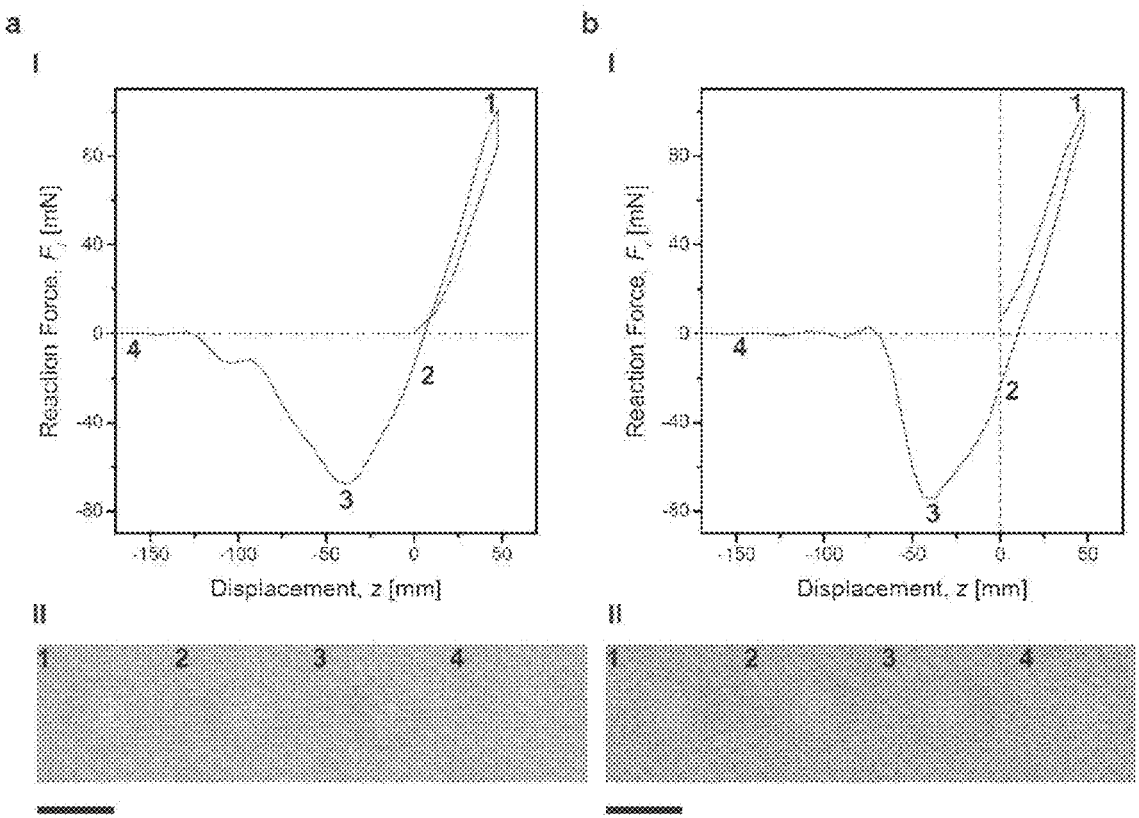

FIG. 15 shows the characterization of the effective work of adhesion ($\omega_{ad}$) and adhesion stress ($\sigma_{ad}$) of the FAM for rigid and soft adhesion systems. FIG. 15a shows a reaction force ($F_r$) profile of the FAM for the soft system (I), in accordance with microscope images on the interface (II). FIG. 15b shows a reaction force ($F_r$) profile of the FAM for the rigid system (I), in accordance with microscope images on the interface (II). 1: preloading, 2: retracting, 3: exerting pull-off force, 4: detached. The scale bar corresponds to 1 mm.

FIG. 16 shows the characterization of adhesion stress ($\sigma_{ad}$) of a single microfiber on the FAM for the soft adhesion system 10. FIG. 16a shows the visualization of the contact area of three microfibers for each of the samples using the confocal laser microscope. The scale bar corresponds to 100 µm. FIG. 16b shows the reaction force ($F_r$) profiles of three microfibers for each sample.

FIGS. 17 and 18 respectively show Tables 1 and 2 with detailed information on a number of characterization results in terms of the adhesion of the rigid and soft adhesion systems, respectively. As mentioned, the air pressure inside of the adhesion systems is modulated by the volume change in the syringe connected to the chamber. The maximum pull-off force ($F_{off}|_{max}$) is the highest value on a given geometry on different initial pressures, while the minimum pull-off force ($F_{off}|_{min}$) is the lowest pull-off force among measurements. The contact area ($A_c$) of the soft system is visually evaluated from the top-side through the transparent chamber. The contact area of the rigid system on non-planar geometries could not be visualized neither from the top nor the side. Therefore, the contact area on large objects, such as 60 mm of $d_b$ glass sphere and flat glass are assumed to have the full contact of 1.7 cm$^2$ with the effective contact radius $r_e$=7.3 mm. Note that the adhesion efficiency ($\varepsilon_{ad}$) of the soft system on the rubber film is not available, since the adhesion stress ($\sigma_{ad}$) of the FAM we tested is only valid on the interface between the PDMS-made fiber and glass substrate.

Experimental methods for estimation of effective work of adhesion ($\omega_{ad}$) of the FAM and its adhesion stress ($\sigma_{ad}$) have been standardized in several previous works based on Johnson, Kendall and Roberts (JKR) theory. Profiles of the reaction force ($F_r$) for a microfiber array on the FAM for both rigid and soft systems are shown in FIG. 15 with respect to vertical displacement (z). In order to rule out deformation of the soft PDMS backing during the measurements, the FAM is place on a flat glass substrate and fixed. A 4 mm radius (R) spherical glass indenter is brought down in contact with the FAM at an approach speed of 100 µm·s$^{-1}$. The origin of z is set on the surface of the FAM, and positive z causes compression while negative z causes tension. A 100 mN of preload ($F_{pre}$) is applied by putting the spherical indenter down to the FAM. Here, we have 30 seconds of relaxation time to minimize unpredictable viscoelastic behavior of the elastomeric microfibers, which causes a slight decrease in reaction force profile. The indenter is pulled up with 50 µm·s$^{-1}$ of retraction speed, which is the same speed used for the experimental measurements. The pull-off force of the microfiber array is measured at five different positions on the FAM; top, center, bottom, left, and right. The work of adhesion of the microfiber array on the FAM can be evaluated by the following relation between the work of adhesion and pull-off force based on JKR theory, $$\omega_{ad} = 2F_{off}/3\pi R \quad [13]$$

Among the five measurements, three cases whose shape of contact is the most circular are selected in evaluating the projected contact area for the calculation in Eq. 13. The contact areas of those measurements are estimated from the still images at the instance of the fiber array pulling off from the surface using a conventional image processing software (ImageJ, NIH Image). Summary of the measurements in the pull-off force, along with the estimated work of adhesion and adhesion stress are shown in FIGS. 19 and 20 depicting Tables 3 and 4.

Estimation of adhesion stress of a single fiber ($\sigma_{ad|sf}$) and small area of microfiber arrays ($\sigma_{ad|3f}$) follow the experimental procedure for the FAM. Three samples (SPL) are taken from different areas of the FAM of the soft system. Each sample has three microfibers and is attached to a flat glass slide to measure the adhesion as shown in FIG. 16b. The 4 mm radius glass indenter is large enough for the three microfibers to make full contact and detach at the same time. The pull-off force of the three microfibers ($F_{off}$) is divided by the number of fibers and estimated as the pull-off force of a single fiber ($F_{off}|_{sf}$). Each sample is measured 5 times with 1 mN of preload ($F_{re}$).

Real contact areas of three microfibers ($A_{rc}$) on each sample are measured using the 3D confocal laser microscope as shown in FIG. 16a, and the real contact area of a single fiber ($A_{rc}|_{sf}$) is estimated by dividing the measured area with the number of fibers. Projected contact areas of the three microfibers ($A_{pc}$) are estimated using the conventional image processing software (ImageJ, NIH Image), including spacing among the microfibers in addition to the real contact area ($A_{rc}$). Adhesion stresses of a single fiber and the three microfibers are calculated by dividing each adhesion with the estimated contact areas. A summary of the above measurements is shown in Table 5 (FIG. 21).

The invention claimed is:

1. A gripping apparatus, the gripping apparatus comprising:
   a membrane;
   a flexible housing;
   said membrane being fixedly connected to a periphery of the housing;
   a cavity closed off between the membrane and the housing;
   a spacer structure comprising a plurality of posts having free ends extending in said cavity; and
   a connection to an air pressure regulator connected to said cavity.

2. The gripping apparatus in accordance with claim 1, wherein an outer surface of the membrane comprises no islands or a plurality of islands projecting from an outer surface of the membrane remote from the cavity.

3. The gripping apparatus in accordance with claim 2, wherein the plurality of islands is formed by fibers or by nano-bumps.

4. The gripping apparatus in accordance with claim 1, wherein the spacer structure is attached to an inner surface of the housing facing said membrane.

5. The gripping apparatus in accordance with claim 1, wherein the spacer structure is attached to the said membrane facing towards the inner surface of the housing.

6. The gripping apparatus in accordance with claim 1, wherein the spacer structure comprises interconnecting channels.

7. The gripping apparatus in accordance with claim 1, wherein the plurality of posts are cylindrically shaped.

8. The gripping apparatus in accordance with claim 1, wherein the membrane and the housing are either made of different material or of the same material.

9. The gripping apparatus in accordance with claim 8, wherein the membrane and the housing are integrally formed or are bonded to one another.

10. The gripping apparatus in accordance with claim 1, wherein the flexible housing has a Young's modulus selected in the range of 10 kPa to 600 MPa.

11. The gripping apparatus in accordance with claim 1, wherein the material of at least one of the housing and the membrane is selected from the group of members consisting of polymers, rubbers, composites, thermoplastic materials, Hydrogels, phase changing materials, shape memory materials, liquid materials, VS, PDMS, liquid crystal elastomers, elastomeric rubbers, silicone rubbers, polyurethane and combinations thereof.

12. The gripping apparatus in accordance with claim 1, wherein the cavity is configured to be evacuated in order to conform and carry out a gripping function, with the housing and the membrane being configured to conform to a shape at least substantially reflecting the shape of a surface of the object to be gripped, partially or at least substantially over the complete outer surface of the membrane.

13. A gripping apparatus in accordance with claim 12, wherein the plurality of posts separate the interconnecting channels and define a spacing between the housing and the membrane when the cavity is evacuated.

14. The gripping apparatus in accordance with claim 12, wherein the cavity is configured to be evacuated to a pressure of up to −101.3 kPa below atmospheric pressure.

15. The gripping apparatus in accordance with claim 12, wherein a spacer structure is present in said cavity, and wherein an at least substantially homogenous negative pressure is present within the spacer structure between the housing and the membrane.

16. The gripping apparatus in accordance with claim 1, wherein the cavity is configured to release the negative pressure or to be inflated in order to carry out a release of a gripping function of the gripping apparatus.

17. The gripping apparatus in accordance with claim 1, wherein the plurality of posts are formed as a monolithic piece of material with one of the housing and the membrane and as a separate piece of material from the other of the housing and the membrane.

18. A method of producing a gripping apparatus comprising: a membrane; a flexible housing; with said membrane being fixedly connected to a periphery of the housing to close off a cavity between the membrane and the housing; and a connection to an air pressure regulator connected to said cavity, the method comprising the steps of:
   providing the housing and the membrane; with the membrane either being integral with the housing or bonded thereto at the periphery of the housing and providing a spacer structure comprising a plurality of posts extending to free ends in said cavity.

19. The method in accordance with claim 18, further including providing islands on the membrane at a side of the membrane remote from the cavity.

* * * * *